US008571321B2

(12) United States Patent
Yamanouchi

(10) Patent No.: US 8,571,321 B2
(45) Date of Patent: Oct. 29, 2013

(54) CHARACTER RECOGNITION DEVICE AND RECORDING MEDIUM

(75) Inventor: Morio Yamanouchi, Fussa (JP)

(73) Assignee: Casio Computer Co., Ltd., Tokyo (JP)

( * ) Notice: Subject to any disclaimer, the term of this patent is extended or adjusted under 35 U.S.C. 154(b) by 195 days.

(21) Appl. No.: 13/189,744

(22) Filed: Jul. 25, 2011

(65) Prior Publication Data

US 2012/0020566 A1  Jan. 26, 2012

(30) Foreign Application Priority Data

Jul. 26, 2010 (JP) .................................. 2010-167143
Jul. 30, 2010 (JP) .................................. 2010-171830

(51) Int. Cl.
*G06K 9/00* (2006.01)

(52) U.S. Cl.
USPC .......................................................... 382/181

(58) Field of Classification Search
USPC .......................................................... 382/181
See application file for complete search history.

(56) References Cited

U.S. PATENT DOCUMENTS

| 6,229,102 | B1 * | 5/2001 | Sato et al. ................... 178/19.01 |
| 8,150,162 | B2 * | 4/2012 | Du et al. ........................ 382/187 |
| 2006/0177112 | A1 | 8/2006 | Yang et al. | |
| 2011/0304534 | A1 | 12/2011 | Zhang | |

FOREIGN PATENT DOCUMENTS

| CN | 101576954 A | 11/2009 |
| EP | 688 826 A2 | 8/2006 |
| JP | 09-081687 A | 3/1997 |
| JP | 09-114926 A | 5/1997 |
| JP | 10-055409 A | 2/1998 |
| JP | 10-301702 A | 11/1998 |
| JP | 2000-268130 A | 9/2000 |
| JP | 2001-357356 A | 12/2001 |
| JP | 2006-079221 A | 3/2006 |
| JP | 2008-070920 A | 3/2008 |
| JP | 2008-078763 A | 4/2008 |
| JP | 2008-310588 A | 12/2008 |
| JP | 2009-099041 A | 5/2009 |

OTHER PUBLICATIONS (Jong Oh, "Inertial Sensor Based Recognition of 3-D Character Gesture with an Ensemble of Classifiers", 2004, IEEE).*

(Continued)

*Primary Examiner* — Samir Ahmed
*Assistant Examiner* — Totam Le
(74) *Attorney, Agent, or Firm* — Holtz, Holtz, Goodman & Chick, PC

(57) ABSTRACT

A character recognition device which recognizes an operation for writing a character performed by a housing including an acceleration sensor 7 while being moved in a spatial plane based on a measurement result from the acceleration sensor, a control section 1 acquires acceleration data of each component acquired during the period from the start of writing to the end of the writing of one character determined based on acceleration data of a component associated with each axis of the acceleration sensor, as a series of acceleration data that are temporally continuous from the first stroke to the last stroke of the character including acceleration between strokes. The control section identifies feature points for each component that exist in a series of acceleration data, generates feature point data for each component which includes the plurality of feature points as inputted character data, and collates it with basic character data.

8 Claims, 22 Drawing Sheets

(56) References Cited

OTHER PUBLICATIONS

Japanese Office Action dated Nov. 4, 2011 (and English translation thereof) in counterpart Japanese Application No. 2010-167143.
Japanese Office Action dated Dec. 26, 2011 (and English translation thereof) in counterpart Japanese Application No. 2010-167143.
Chinese Office Action dated Dec. 26, 2012 (and English translation thereof) in counterpart Chinese Application No. 201110208692.5.

\* cited by examiner

EXAMPLE OF WAVEFORM WITH UNCLEAR FEATURES

WHEN ROTATED BY 45 DEGREES

FIG. 12

$$\begin{pmatrix} \text{ACCELERATION OF FIRST COMPONENT ON COORDINATE ROTATED BY 45 DEGREES} \\ \text{ACCELERATION OF SECOND COMPONENT ON COORDINATE ROTATED BY 45 DEGREES} \end{pmatrix} = \begin{pmatrix} \cos 45° & -\sin 45° \\ \sin 45° & \cos 45° \end{pmatrix} \begin{pmatrix} \text{ACCELERATION OF FIRST COMPONENT} \\ \text{ACCELERATION OF SECOND COMPONENT} \end{pmatrix}$$

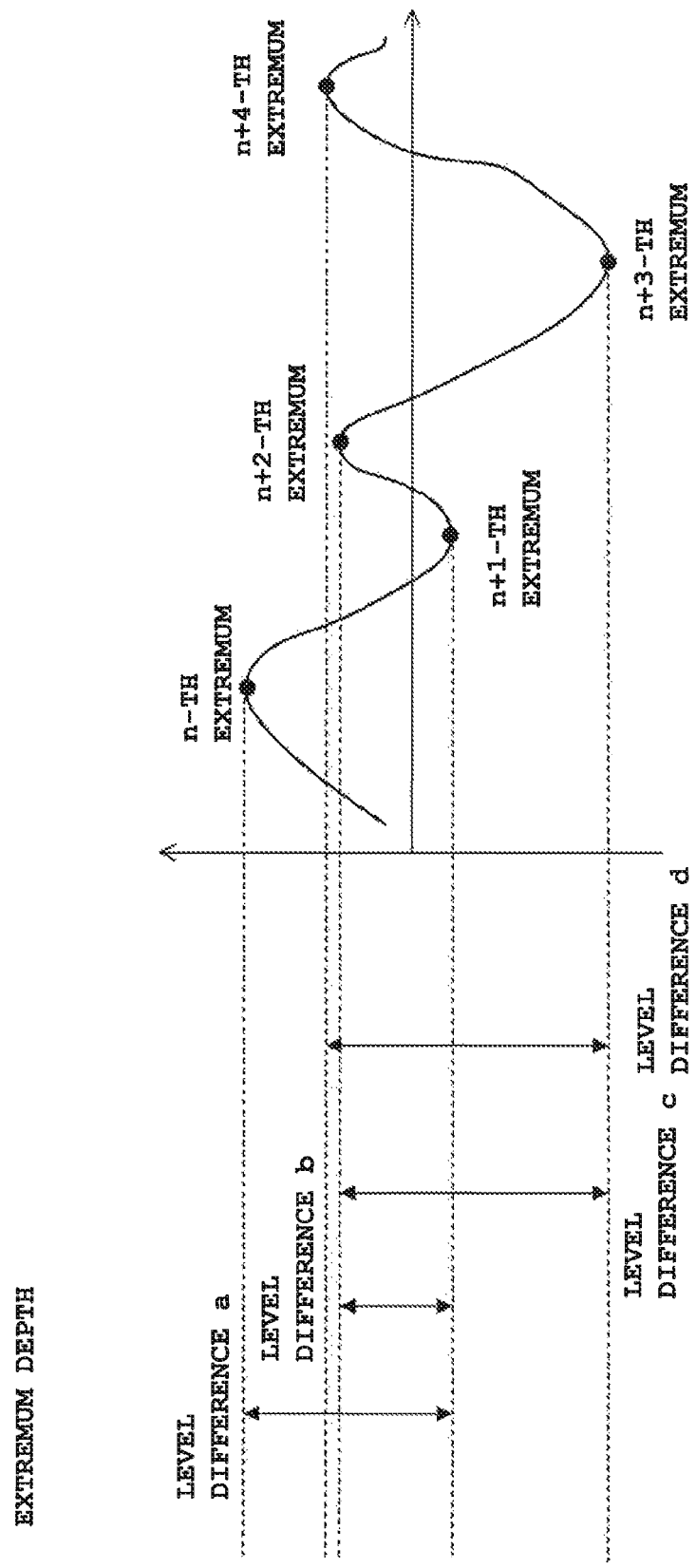

FIG. 14A

| BASIC F(j,0) |
|---|
| BASIC F(j,1) |
| BASIC F(j,2) |

| INPUT F(j,0) | FEATURE POINT THAT IS NOT PARTICULARLY IMPORTANT |
|---|---|
| INPUT F(j,1) | IMPORTANT FEATURE POINT |
| INPUT F(j,2) | IMPORTANT FEATURE POINT |
| INPUT F(j,3) | IMPORTANT FEATURE POINT |
| INPUT F(j,4) | IMPORTANT FEATURE POINT |
| INPUT F(j,5) | FEATURE POINT THAT IS NOT PARTICULARLY IMPORTANT |

FIG. 14B

| BASIC F(j,0) |
|---|
| BASIC F(j,1) |
| BASIC F(j,2) |
| BASIC F(j,3) |
| BASIC F(j,4) |
| BASIC F(j,5) |

| INPUT F(j,0) |
|---|
| INPUT F(j,1) |
| INPUT F(j,2) |
| INPUT F(j,3) |

FIG. 15

RECOGNITION DICTIONARY MEMORY DM

BASIC CHARACTERS

| K | R | Rf | Rd | L | Lf | Ld | T |
|---|---|---|---|---|---|---|---|
| K(0,1,0) | R(0,1,0) | Rf(0,1,0) | Rd(0,1,0) | L(0,1,0) | Lf(0,1,0) | Ld(0,1,0) | T(0,1,0) |
| K(0,1,1) | R(0,1,1) | Rf(0,1,1) | Rd(0,1,1) | L(0,1,1) | Lf(0,1,1) | Ld(0,1,1) | T(0,1,1) |
| K(0,1,M-1) | R(0,1,M-1) | Rf(0,1,M-1) | Rd(0,1,M-1) | L(0,1,M-1) | Lf(0,1,M-1) | Ld(0,1,M-1) | T(0,1,M-1) |
| K(0,2,0) | R(0,2,0) | Rf(0,2,0) | Rd(0,2,0) | L(0,2,0) | Lf(0,2,0) | Ld(0,2,0) | T(0,2,0) |
| K(0,2,1) | R(0,2,1) | Rf(0,2,1) | Rd(0,2,1) | L(0,2,1) | Lf(0,2,1) | Ld(0,2,1) | T(0,2,1) |
| K(0,2,N-1) | R(0,2,N-1) | Rf(0,2,N-1) | Rd(0,2,N-1) | L(0,2,N-1) | Lf(0,2,N-1) | Ld(0,2,N-1) | T(0,2,N-1) |
| K(45,1,0) | R(45,1,0) | Rf(45,1,0) | Rd(45,1,0) | L(45,1,0) | Lf(45,1,0) | Ld(45,1,0) | T(45,1,0) |
| K(45,1,1) | R(45,1,1) | Rf(45,1,1) | Rd(45,1,1) | L(45,1,1) | Lf(45,1,1) | Ld(45,1,1) | T(45,1,1) |
| K(45,2,P-1) | R(45,2,P-1) | Rf(45,2,P-1) | Rd(45,2,P-1) | L(45,2,P-1) | Lf(45,2,P-1) | Ld(45,2,P-1) | T(45,2,P-1) |
| K(45,2,0) | R(45,2,0) | Rf(45,2,0) | Rd(45,2,0) | L(45,2,0) | Lf(45,2,0) | Ld(45,2,0) | T(45,2,0) |
| K(45,2,1) | R(45,2,1) | Rf(45,2,1) | Rd(45,2,1) | L(45,2,1) | Lf(45,2,1) | Ld(45,2,1) | T(45,2,1) |
| K(45,2,Q-1) | R(45,2,Q-1) | Rf(45,2,Q-1) | Rd(45,2,Q-1) | L(45,2,Q-1) | Lf(45,2,Q-1) | Ld(45,2,Q-1) | T(45,2,Q-1) |

WHEN SHIFTED TO COME AFTER BASIC RATIO

WHEN SHIFTED TO COME BEFORE BASIC RATIO

CHARACTER RECOGNITION DEVICE AND RECORDING MEDIUM

CROSS-REFERENCE TO RELATED APPLICATIONS

This application is based upon and claims the benefit of priority from the prior Japanese Patent Applications No. 2010-167143, filed Jul. 26, 2010 and No. 2010-171830, filed Jul. 30, 2010, the entire contents of which are incorporated herein by reference.

BACKGROUND OF THE INVENTION

1. Field of the Invention

The present invention relates to a character recognition device that recognizes a character-writing operations performed by its housing including an acceleration sensor while being moved in a spatial plane, based on measurement results from the acceleration sensor, and a recording medium.

2. Description of the Related Art

Conventionally, numerous technologies have been proposed as a technology to measure a person's character-writing operation with an inertial sensor, and measurement results are loaded into a computer. For example, in Japanese Patent Application Laid-Open (Kokai) Publication No. 2009-099041, a technology is proposed in which an acceleration sensor is housed in a pen-tip, and measurement results of this acceleration sensor are extracted as the movement trajectory of the pen-tip. Additionally, in Japanese Patent Application Laid-Open (Kokai) Publication No. 2008-070920, a technology is proposed in which a mobile phone device includes an acceleration sensor, and input information specified by a handwriting operation is recognized based on movement information of the device body corresponding to a detection result of the acceleration sensor.

However, most of the technologies, which use an acceleration sensor to perform character recognition, have a problem in that they calculate speed from acceleration by integrating a measurement result of the acceleration sensor two times, and use the movement trajectory of this position calculated from speed of character recognition. In methods such as these, problems regarding failures to detect the integration initial state (start writing position), and integration errors occur. Additionally, it is necessary to integrate the output of an angular velocity sensor to track changes of gravitational direction in order to eliminate the strong disturbance of gravity from measurement data. Since the above-described problem regarding failures to detect the integration initial state and integration errors exist, it is extremely difficult to realize reliable character recognition.

SUMMARY OF THE INVENTION

An object of the present invention is to enable efficient and reliable character recognition of characters written in a spatial plane based on measurement results from an acceleration sensor.

In order to achieve the above-described object, in accordance with one aspect of the present invention, there is provided a character recognition device comprising: an acceleration sensor which senses at least two axes; an acquisition section which acquires a measurement result from the acceleration sensor which is based on an operation for writing a character performed by a housing of the character recognition device while being moved in a plane, as acceleration data of a component associated with each axis; a determination section which determines a start of writing and an end of writing of one character based on the acceleration data of each component acquired by the acquisition section; an identification section which identifies, with the acceleration data of each component sequentially acquired by the acquisition section during a period from when the start of the writing of one character is determined to when the end of the writing of the character is determined by the determination section as a series of acceleration data that are temporally continuous from a first stroke to a last stroke of the character including acceleration between strokes, a plurality of feature points that exist in the series of acceleration data for each component; a generation section which generates feature point data for each component including the plurality of feature points identified by the identification section, as inputted character data; and a character recognition section which performs character recognition by collating basic character data, which has been prepared in advance for use in the character recognition, including a plurality of feature points for each component, and the inputted character data generated by the generation section.

In accordance with another aspect of the present invention, there is provided a character recognition device comprising: a three-axis acceleration sensor; an acquisition section which acquires a measurement result from the acceleration sensor which is based on an operation for writing a character by a housing of the character recognition device while being moved in a plane, as a time-series acceleration vector sequence for one character; a selection section which selects a plurality of acceleration vectors whose vector sizes are large values which are substantially orthogonal to each other, from the acceleration vector sequence for one character which has been acquired by the acquisition section; a plane identification section which identifies a plane defined by the plurality of acceleration vectors selected by the selection section; a first conversion section which converts the acceleration vector sequence for one character, which has been acquired by the acquisition section, to acceleration vector sequences of two components orthogonal in the plane identified by the plane identification section; and a character recognition section which performs character recognition by collating, with the acceleration vector sequences of the two components in the plane which has been converted by the first conversion section as inputted character data, the inputted character data and basic character data prepared in advance for use in the character recognition.

In accordance with another aspect of the present invention, there is provided a non-transitory computer-readable storage medium having stored thereon a program that is executable by a computer, the program being executable by the computer to perform functions comprising: processing for, when recognizing an operation for writing a character performed by a housing including an acceleration sensor that senses at least two axes while being moved in a plane based on a measurement result from the acceleration sensor, acquiring the measurement result from the acceleration sensor which is based on the operation for writing the character performed by the housing while being moved in the plane, as acceleration data of a component associated with each axis; processing for determining a start of writing and an end of writing of one character based on the acquired acceleration data of each component; processing for identifying, with the acceleration data of each component sequentially acquired during a period from when the start of the writing of one character is determined to when the end of the writing of the character is determined as a series of acceleration data that are temporally continuous from a first stroke to a last stroke of the character including acceleration between strokes, a plurality of feature points that exist in the series of acceleration data for each component; processing for generating feature point data for each component which includes the identified plurality of feature points, as inputted character data; and processing for performing character recognition by collating basic character data, which has been prepared in advance for use in the character recognition, including a plurality of feature points for each component, and the generated inputted character data.

In accordance with another aspect of the present invention, there is provided a non-transitory computer-readable storage medium having stored thereon a program that is executable by a computer, the program being executable by the computer to perform functions comprising: processing for, when recognizing an operation for writing a character performed by a housing including a three-axis acceleration sensor while being moved in a plane based on a measurement result from the three-axis acceleration sensor, acquiring the measurement result from the acceleration sensor which is based on the operation for writing the character performed by the housing while being moved, as a time-series acceleration vector sequence for one character; processing for selecting a plurality of acceleration vectors whose vector sizes are large values which are substantially orthogonal to each other, from the acquired acceleration vector sequence for one character; processing for identifying a plane defined by the selected plurality of acceleration vectors; processing for converting the acquired acceleration vector sequence for one character to acceleration vector sequences of two components orthogonal in the identified plane; and processing for performing character recognition by collating, with the converted acceleration vector sequences of the two components in the plane as inputted character data, the inputted character data and basic character data prepared in advance for use in the character recognition.

According to the present invention, a character written in a plane can be smoothly and infallibly recognized based on measurement results from an acceleration sensor. Therefore, the usefulness of the present invention is high.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

BRIEF DESCRIPTION OF THE DRAWINGS

FIG. 9A shows a waveform before each axis in a spatial plane is rotated by 45 degrees in the same respective direction, and FIG. 9B shows a waveform after each axis in a spatial plane is rotated by 45 degrees in the same respective direction;

FIG. 12 is a diagram showing a rotation conversion formula using a "rotation matrix" to convert acceleration data for one character into acceleration data on a rotated coordinate system where each axis in a spatial plane has been rotated;

FIG. 13 is a diagram showing a variation example of the first and the second embodiments, which is used to describe the depth of peak points;

FIG. 14A and FIG. 14B are diagrams of a variation example of the first and second embodiments, which show the number of feature points of a certain component in inputted character data, and the number of feature points of the same component in certain basic character data;

FIG. 15 is a diagram of a variation example of the first and second embodiments, which shows the configuration of basic character data in the recognition dictionary memory DM;

DETAILED DESCRIPTION OF THE PREFERRED EMBODIMENTS

The present invention will hereinafter be described in detail with reference to the preferred embodiments shown in the accompanying drawings.

First Embodiment

A first embodiment of the present invention will be described with reference to FIG. 1 to FIG. 8J.

Figure 1:
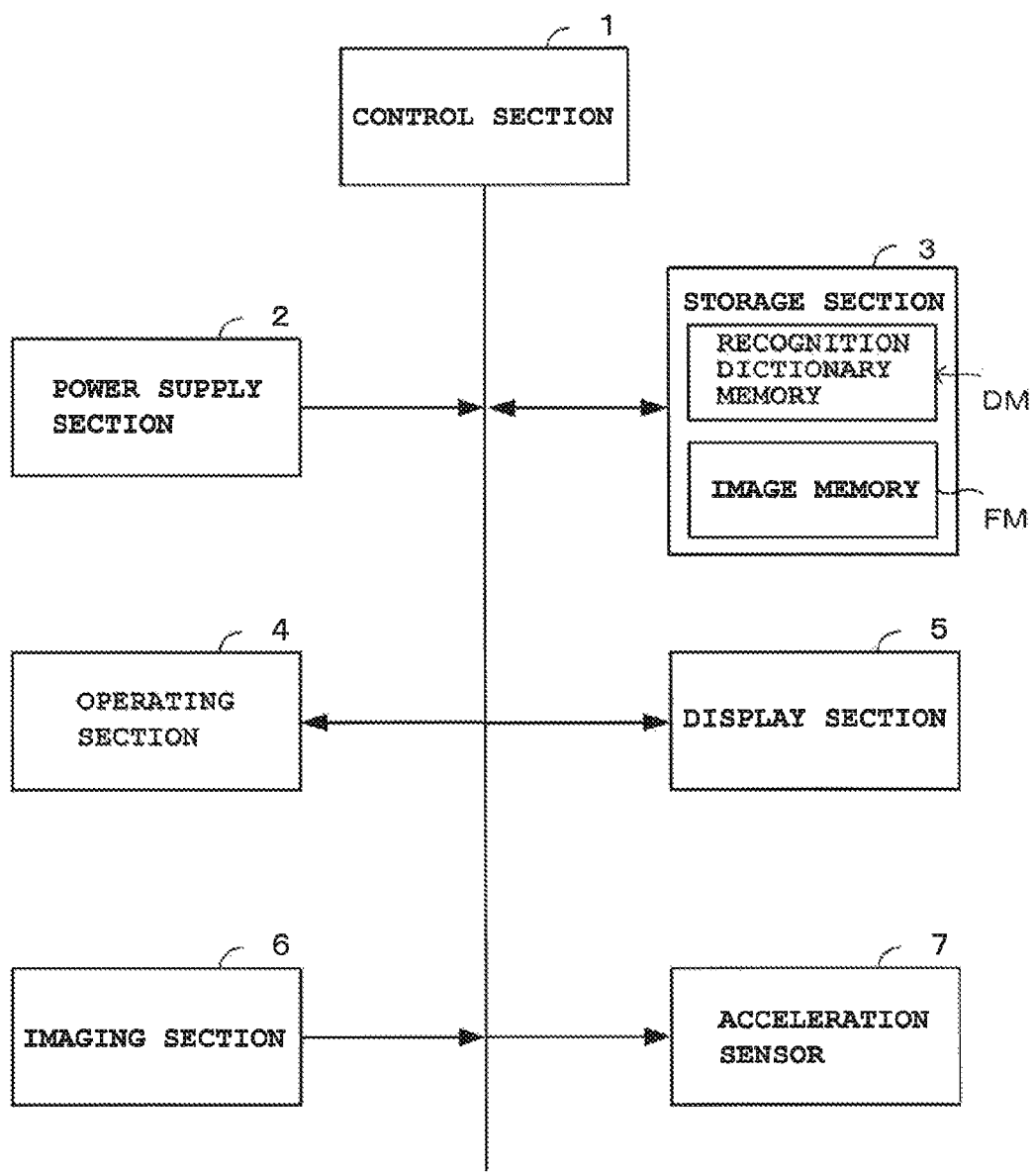
FIG. 1 is a block diagram showing basic components of an imaging apparatus (digital camera) having a character recognition function, in which the present invention has been applied as a character recognition device.

The first embodiment is an example in which the present invention has been applied as a character recognition device to an imaging apparatus (digital camera) having a character recognition function. FIG. 1 is a block diagram showing basic components of the digital camera having a character recognition function.

This digital camera is a portable compact camera having a character recognition function for recognizing a character written in a spatial plane in addition to basic functions such as an imaging function and a clock function, and operates with a control section 1 serving as a core. The control section 1 (acquisition section, determination section, identification section, generation section, character recognition section, removal section, and rotation conversion section), which operates by receiving power supply from a power supply section 2 including a secondary battery, controls the overall operations of the digital camera in accordance with various programs stored in a storage section 3. A central processing unit (CPU), a memory, and the like (not shown) are provided in this control section 1.

The storage section 3 is an internal memory, such as a read-only memory (ROM) or a random access memory (RAM), and has a program area and a data area (not shown). In the program area of the storage section 3, programs are stored which actualize the first embodiment based on operation procedures shown in FIG. 6 and FIG. 7 described hereafter. In the data area of the storage section 3, various flag information and various information required to operate the digital camera are stored, in addition to a recognition dictionary memory DM for storing basic character data used in character recognition and image memory FM for storing captured images. Note that the storage section 3 may be, for example, structured to include a detachable portable memory (recording media) such as a secure digital (SD) card or an integrated circuit (IC) card. Alternatively, the storage section 3 may be structured to be provided on a predetermined external server (not shown).

An operating section 4 performs character input, command input, etc., and includes an ON/OFF key for turning ON and OFF a camera function, a shutter key, and the like (not shown). The control section 1 performs various types of processing, such as camera ON/OFF processing and image-capture processing, as processing based on operation signals from the operating section 4. A display section 5 includes, for example, high-definition liquid crystal or organic electroluminescent (EL), and displays date and time information and stored images. Also, the display section 5 serves as a finder screen that displays a live-view image (monitor image) when the camera function is being used.

An imaging section 6, which is a component actualizing a digital camera function, is capable of capturing still images and video, and includes a camera lens section, an image sensor (such as a charge-coupled device [CCD] or a complementary metal-oxide-semiconductor [CMOS]), an image signal processing section, an analog processing section, a compression and expansion section, various sensor sections (such as a distance sensor and a light quantity sensor), etc. This imaging section 6 controls the adjustment of optical zoom, the driving of auto focus, the driving of a shutter, exposure, white balance, etc., and measures shutter speed (exposure time). Also, the imaging section 6 includes a bifocal lens capable of being switched between telescope and wide-angle according to a photographic subject, and a zoom lens, and performs telescopic/wide-angle or zoom imaging by operating a viewing angle changing mechanism that changes a focal distance.

An acceleration sensor 7 is an acceleration sensor that senses at least two axes (a three-axis acceleration sensor according to the first embodiment), and is included in the body (housing) of the digital camera. This acceleration sensor 7 is one of the components actualizing the character recognition function. Note that another configuration may be applied in which, for example, an acceleration sensor constituting a pedometer is used for the character recognition function. During the operation of the character recognition function, the control section 1 performs character recognition based on measurement results from the acceleration sensor 7. That is, the control section 1 identifies a two-dimensional plane (vertical plane) parallel to the gravitational force direction based on measurement results from the acceleration sensor 7, or in other words, acceleration components in three axial directions (X, Y, and Z directions) that are orthogonal to one another, and then performs character recognition based on acceleration data that has been separated into components of two axes that are orthogonal in the plane, or in other words, acceleration data of a first axis (first component) and acceleration data of a second axis (second component).

Here, the control section 1 determines the start and the end of the writing of one character based on the acceleration data of the components of the two orthogonal axes separated in the two-dimensional plane that is parallel to the gravitational force direction. With the acceleration data of each component sequentially acquired during the period from the start of writing to the end of the writing of the character as a series of acceleration data that is temporally continuous from the first stroke of the character to the last stroke of the character including acceleration between strokes, the control section 1 identifies, for each component, a plurality of feature points present in the series of acceleration data. Then, the control section 1 generates feature point data for each component including the plurality of feature points identified as described above as inputted character data, and performs character recognition by collating the inputted character data with each basic character data in the recognition dictionary memory DM.

That is, the inputted character data is feature point data including a plurality of feature points for each of the components of the two orthogonal axes separated in the two-dimensional plane. Each feature point, which is described in detail hereafter, indicates maxima that is a local maximum point or minima that is a local minimum point, and is composed of data regarding "type of extremum", "extremum time (temporal position)", "extremum level (acceleration magnitude)", and "correlating feature with other axis (ratio)". Similarly, each basic character data in the recognition dictionary memory DM is also composed of "type of extremum" "extremum time (temporal position)", "extremum level (acceleration magnitude)", and "correlating feature with other axis (ratio)" for each feature point. Character recognition is performed by this inputted character data and all basic character data being collated for each feature point.

Figure 2:
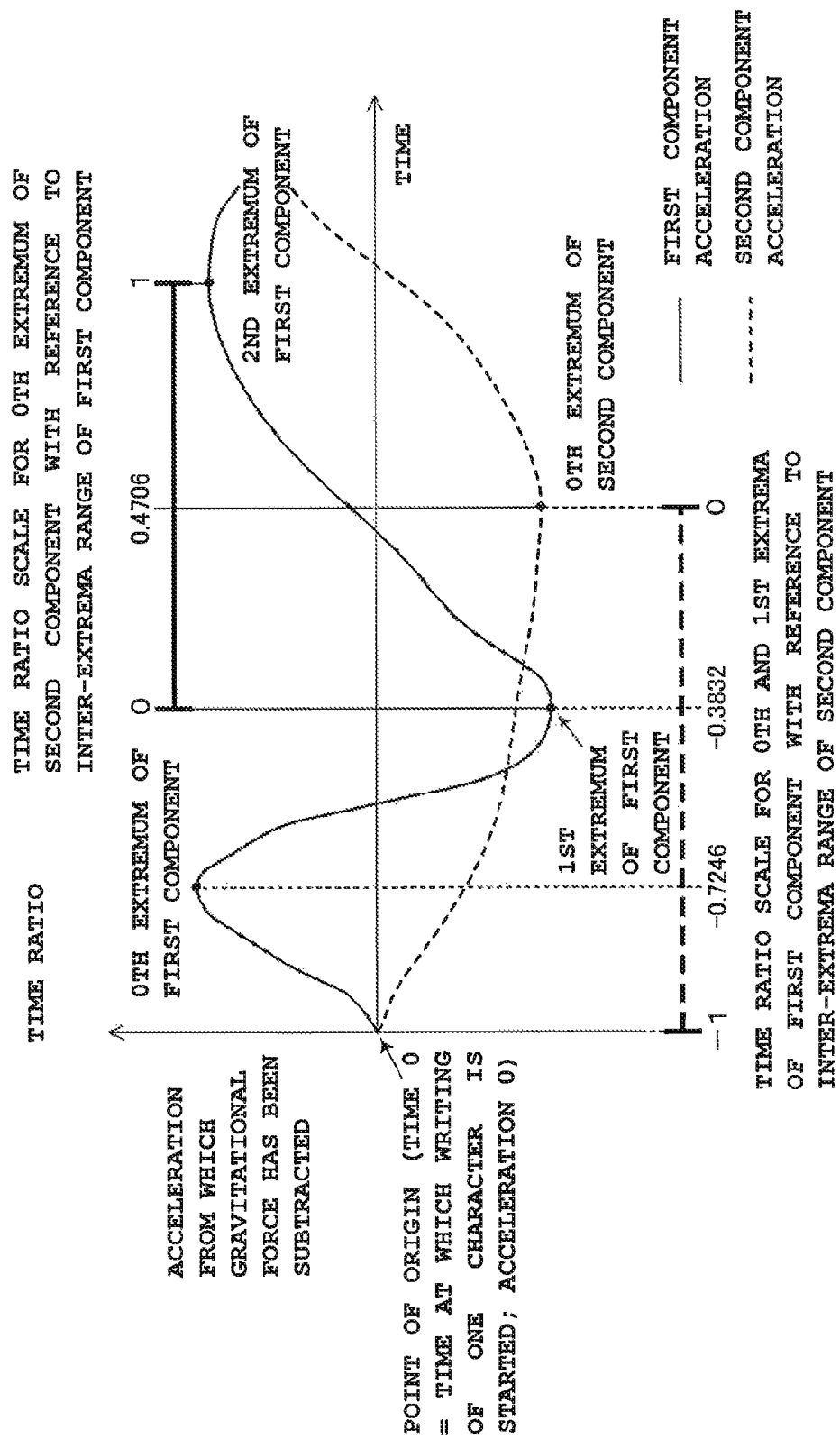
FIG. 2 is a diagram for explaining feature points respectively identified from acceleration data for each component including a plurality of feature points, and time ratio indicating a correlating feature with another axis.
Figure 3:
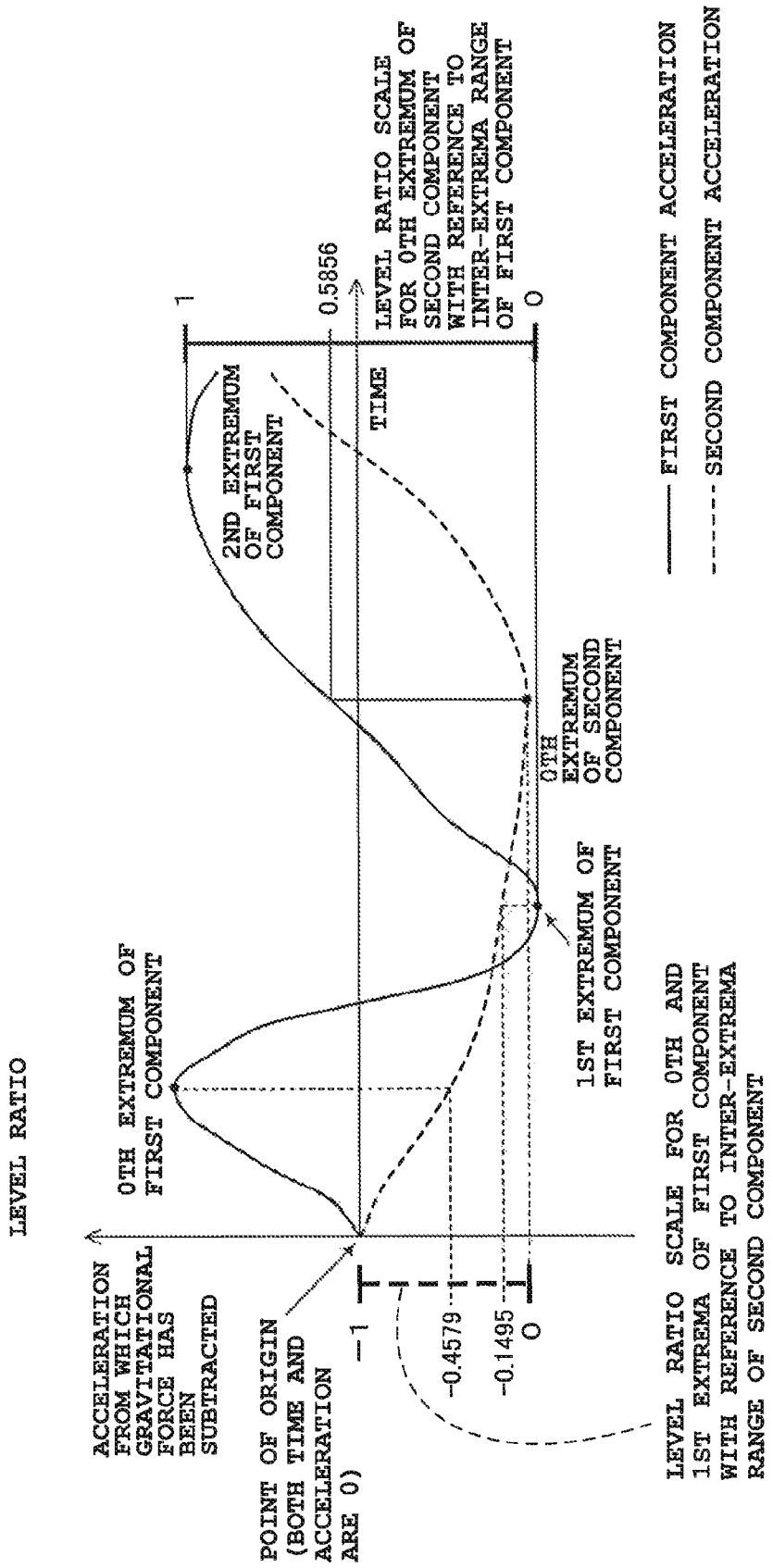
FIG. 3 is a diagram for explaining feature points respectively identified from acceleration data for each component including a plurality of feature points, and level ratio indicating a correlating feature with another axis.

FIG. 2 and FIG. 3 are waveform diagrams showing a changing state in acceleration data of each component, and are used for explaining feature points respectively identified from acceleration data for each component that includes a plurality of feature points.

In FIG. 2 and FIG. 3, a vertical axis indicates acceleration in which gravitational force has been subtracted from measurement results acquired by the acceleration sensor 7, and a horizontal axis indicates time. A solid-line waveform indicates acceleration data of one component (first component) from the components of two orthogonal axes separated in a two-dimensional plane, and a broken-line waveform indicates acceleration data of the other component (second component). Here, the control section 1 identifies a maxima that is a local maximum point and a minima that is a local minimum point in the acceleration data of each component as feature points, and determines, for each feature point, "type of extremum" indicating whether the extremum is maxima or minima and an acceleration value of the extremum as "extremum level". Also, the control section 1 determines, for each feature point, time to reach each extremum (maxima and minima) when a writing start position of the character is a point of origin (time "0" and acceleration "0") as "extremum time".

In addition, the control section 1 determines, for each feature point in the acceleration data of one axis, data indicating a correlation with a feature point in acceleration data associated with the other axis as "correlating feature with other axis (ratio)". Note that the other axis herein refers to the axis of a second component when an extremum for which the correlating feature being determined is an extremum of the first component, or the axis of a first component when an extremum for which the correlating feature being determined is an extremum of the second component. In addition, "correlating feature with other axis" refers to a ratio in terms of time (time ratio) and a ratio in terms of level (level ratio) indicating a relative position when an inter-extrema range from a maxima to a minima or from a minima to a maxima of the other axis is used as reference. This "correlating feature with other axis" is determined for all extrema. "Correlating feature with other axis (ratio)" is determined as described above because character recognition described hereafter becomes difficult, or more specifically, processing for comparing similarity with an extremum of a basic character that is a collation subject becomes difficult when a character is written quickly or slowly, or with varying speed in part. Accordingly, a correlation with the other axis is used as an indicator, whereby the effects of speed or changes in speed at which a character is written can be reduced.

FIG. 2 is a diagram for explaining time ratio serving as a correlating feature with the other axis. The time ratio is a ratio in terms of time that indicates a relative position for each feature point of one axis with reference to the inter-extrema range of the other axis. That is, in the example in FIG. 2, the correlating features with the other axis (time ratios) at the 0th extremum and the 1st extremum of the first component are respectively "−0.7246" and "−0.3832" when the inter-extrema range from the maxima to the minima or from the minima to the maxima of the second component is used as reference (time ratio scale). In addition, the correlating feature with the other axis (time ratio) at the 0th extremum of the second component is "0.4706" when the inter-extrema range from the maxima to the minima or from the minima to the maxima of the first component is used as reference (time ratio scale).

In FIG. 2, when the 0th extremum of a certain component is a maxima, the start of the writing of the character for the component is determined to be a minima, for convenience of explanation. Conversely, when the 0th extremum is a minima, the start of the writing of the character is determined to be a maxima. Similarly, when the immediately preceding extremum is a maxima, the end of the writing of the character is determined to be a minima, for convenience of explanation. Conversely, when the immediately preceding extremum is a minima, the end of the writing of the character is determined to be a maxima. In the calculation of the ratio when the acceleration of the other axis is decreasing, the position of the own extremum is calculated as a ratio that is a negative value, with the maxima as −1 and the minima as 0, for example. In the calculation of the ratio when the acceleration of the other axis is increasing, the position of the own extremum is calculated as a ratio that is a positive value, with the maxima as 1 and the minima as 0, for example. The same applies to the instance in FIG. 3 described hereafter.

FIG. 3 is a diagram for explaining a level ratio indicating a correlating feature with the other axis. The level ratio is a ratio in terms of level indicating a relative size for each feature point of one axis with reference to the inter-extrema range of the other axis. In the example in FIG. 3, "correlating features with other axis (level ratio)" at the 0th extremum and the 1st extremum of the first component are respectively "−0.4579" and "−0.1495" when the inter-extrema range from the maxima to the minima or from the minima to the maxima of the second component is used as reference (level ratio scale). In addition, the correlating feature with the other axis (level ratio) at the 0th extremum of the second component is "0.5856" when the inter-extrema range from the maxima to the minima or from the minima to the maxima of the first component is used as reference (level ratio scale).

Figure 4:
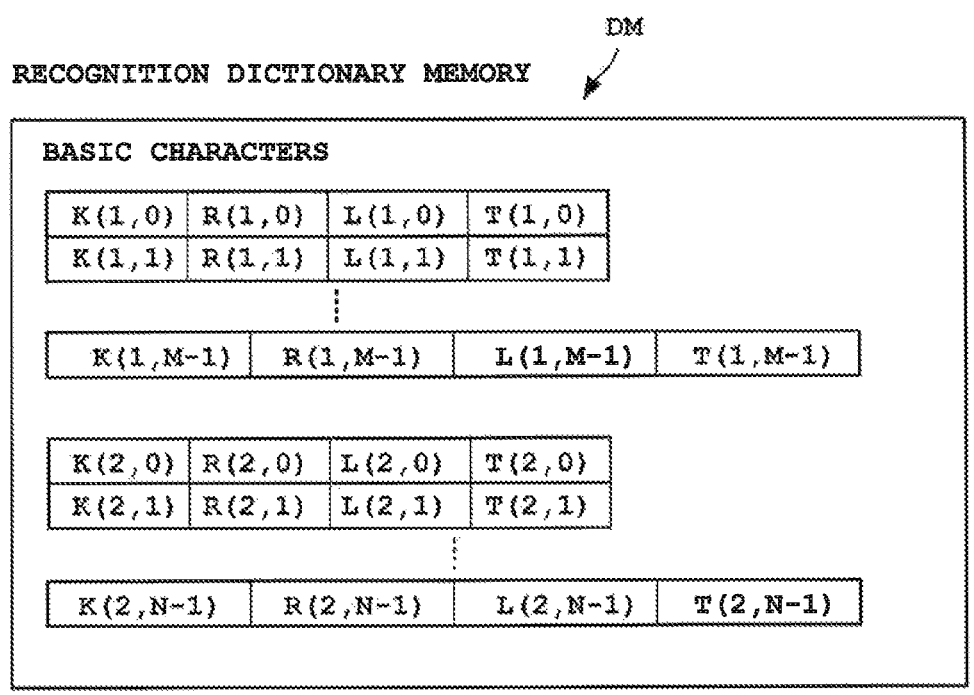
FIG. 4 is a diagram for explaining basic character data in a recognition dictionary memory DM.

FIG. 4 is a diagram for explaining basic character data in the recognition dictionary memory DM.

The recognition dictionary memory DM stores basic character data prepared in advance for use in character recognition. The basic character data is composed only of feature points (extrema) that always appear when a character is written, and is feature point data having a plurality of feature points (extrema) associated with the components of two orthogonal axes. The feature point data includes field data "K(j,k)", "R(j,k)", "L(j,k)", "T(j,k)" for each feature point of each component. The field data "K(j,k)" indicates the type (maxima or minima) of a k-th extremum in the acceleration of a j-th component. The field data "R(j,k)" indicates a correlating feature with the other axis (time ratio or level ratio) of the same extremum. The field data "L(j,k)" indicates the extremum level of the same extremum. The field data "T(j,k)" indicates the extremum time of the same extremum.

The example in FIG. 4 shows an instance in which the number of extrema in the acceleration of a first component is M. The recognition dictionary memory DM has the fields "K(1,0)", "R(1,0)", "L(1,0)", and "T(1,0)" in association with the 0th extremum of the first component, the fields "K(1,1)", "R(1,1)", "L(1,1)", and "T(1,1)" in association with the 1st extremum, and the fields "K(1,M−1)" "R(1,M−1)" "L(1,M−1)", and "T(1,M−1)" in association with the M-th extremum. The example in FIG. 4 also shows an instance in which the number of extrema in the acceleration of a second component is N. The recognition dictionary memory DM has the fields "K(2,0)", "R(2,0)", "L(2,0)", and "T(2,0)" in association with the 0th extremum of the second component, the fields "K(2,1)", "R(2,1)", "L(2,1)", and "T(2,1)" in association with the 1st extremum, and the fields "K(2,N−1)", "R(2,N−1)", "L(2,N−1)", and "T(2,N−1)" in association with the N-th extremum. The values of M and N are not necessarily the same and may differ.

Next, the operational concept of the digital camera according to the first embodiment will be described with reference to flowcharts shown in FIG. 6 and FIG. 7. Here, each function described in the flowcharts is stored in a readable program code format, and operations based on these program codes are sequentially performed. Also, operations based on the above-described program codes transmitted over a transmission medium such as a network can also be sequentially performed. That is, the unique operations of the present embodiment can be performed using programs and data supplied from an outside source over a transmission medium, in addition to a recording medium. This applies to other embodiments described later.

Figure 5:
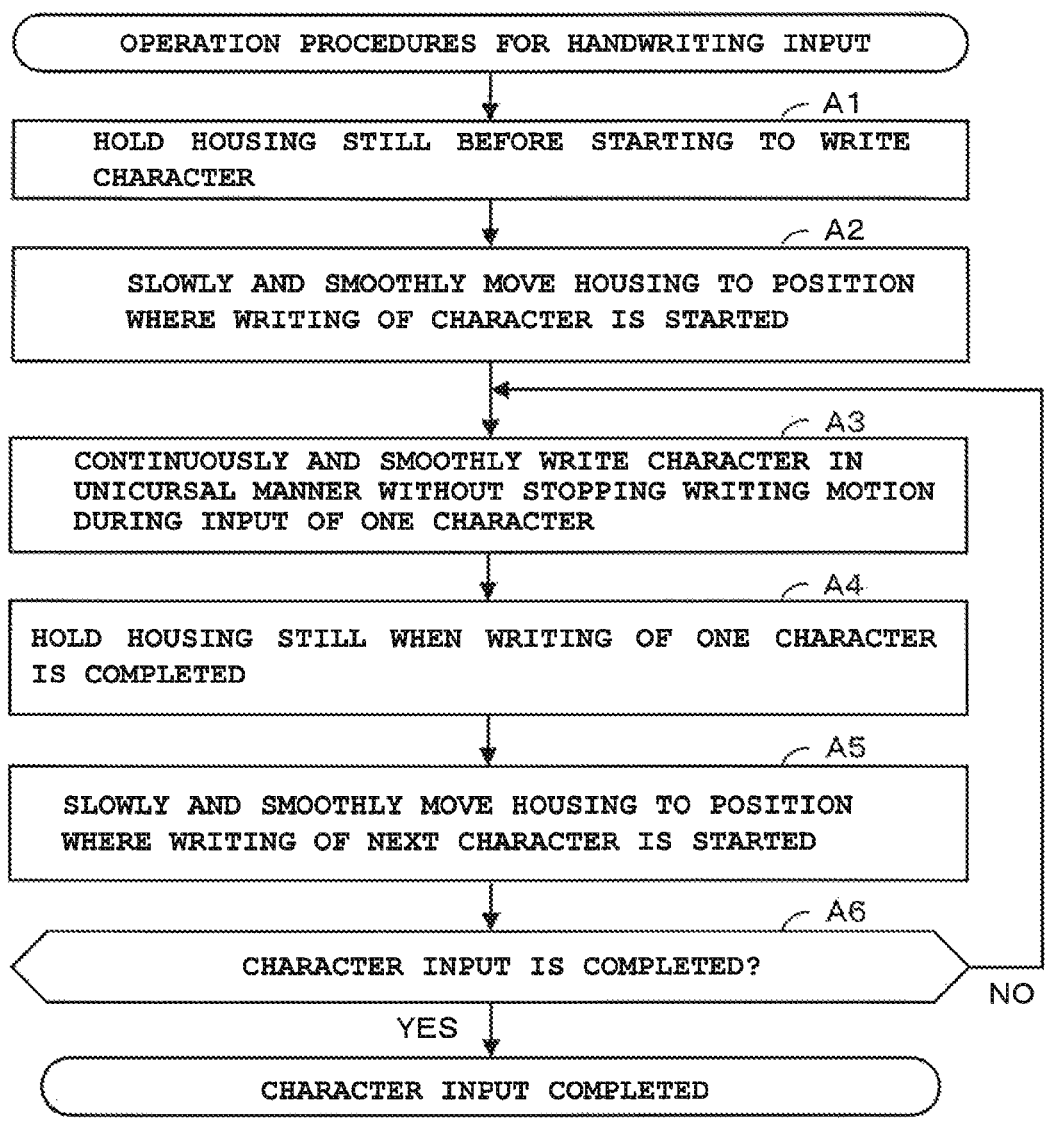
FIG. 5 is a flowchart for explaining operation procedures and an operation method used when a user inputs a handwritten character.
Figure 6:
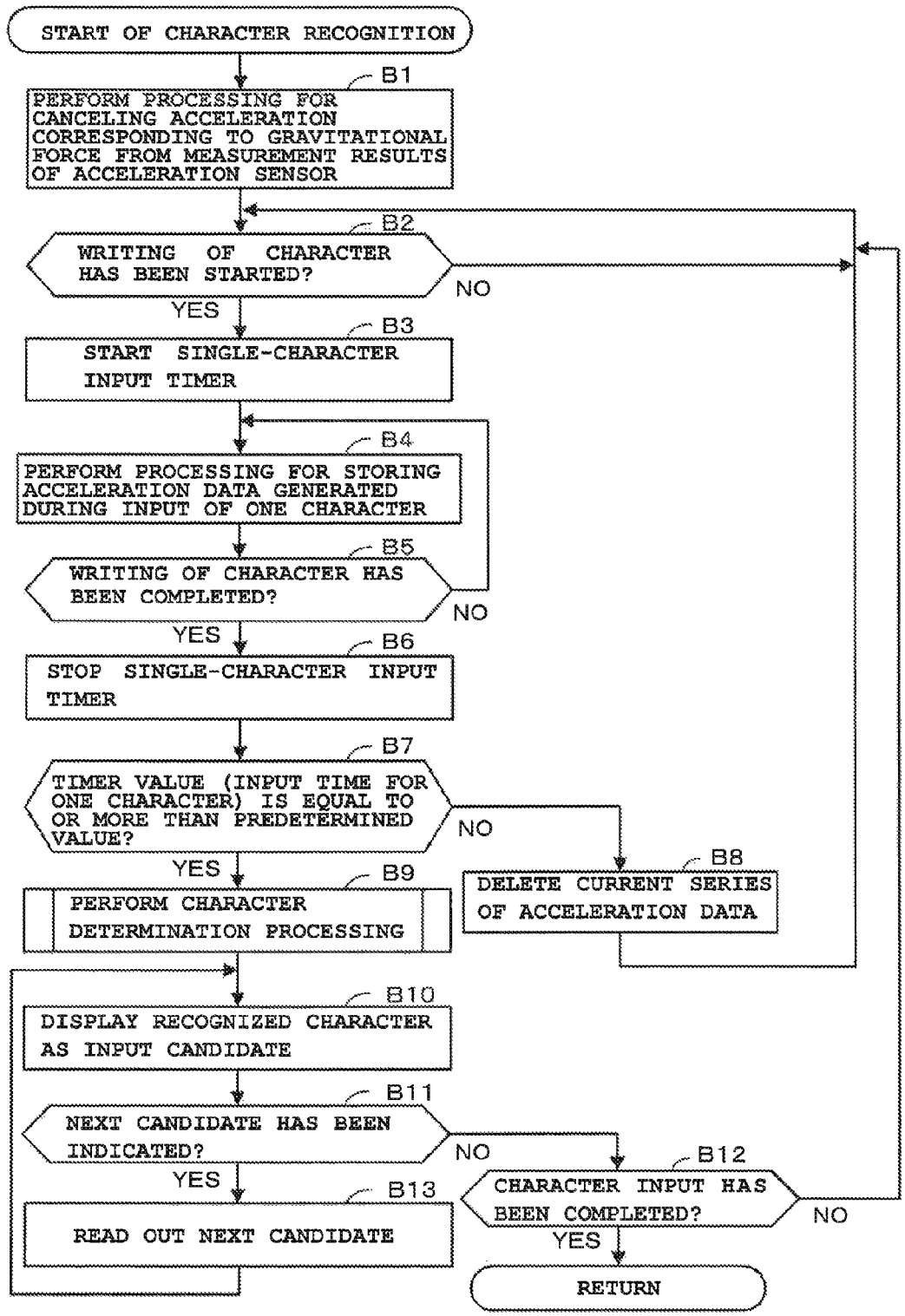
FIG. 6 is a flowchart outlining operations of the characteristic portion of a first embodiment from among all of the operations of the digital camera, which is performed when the character recognition function is turned ON and character recognition is started.
Figure 7:
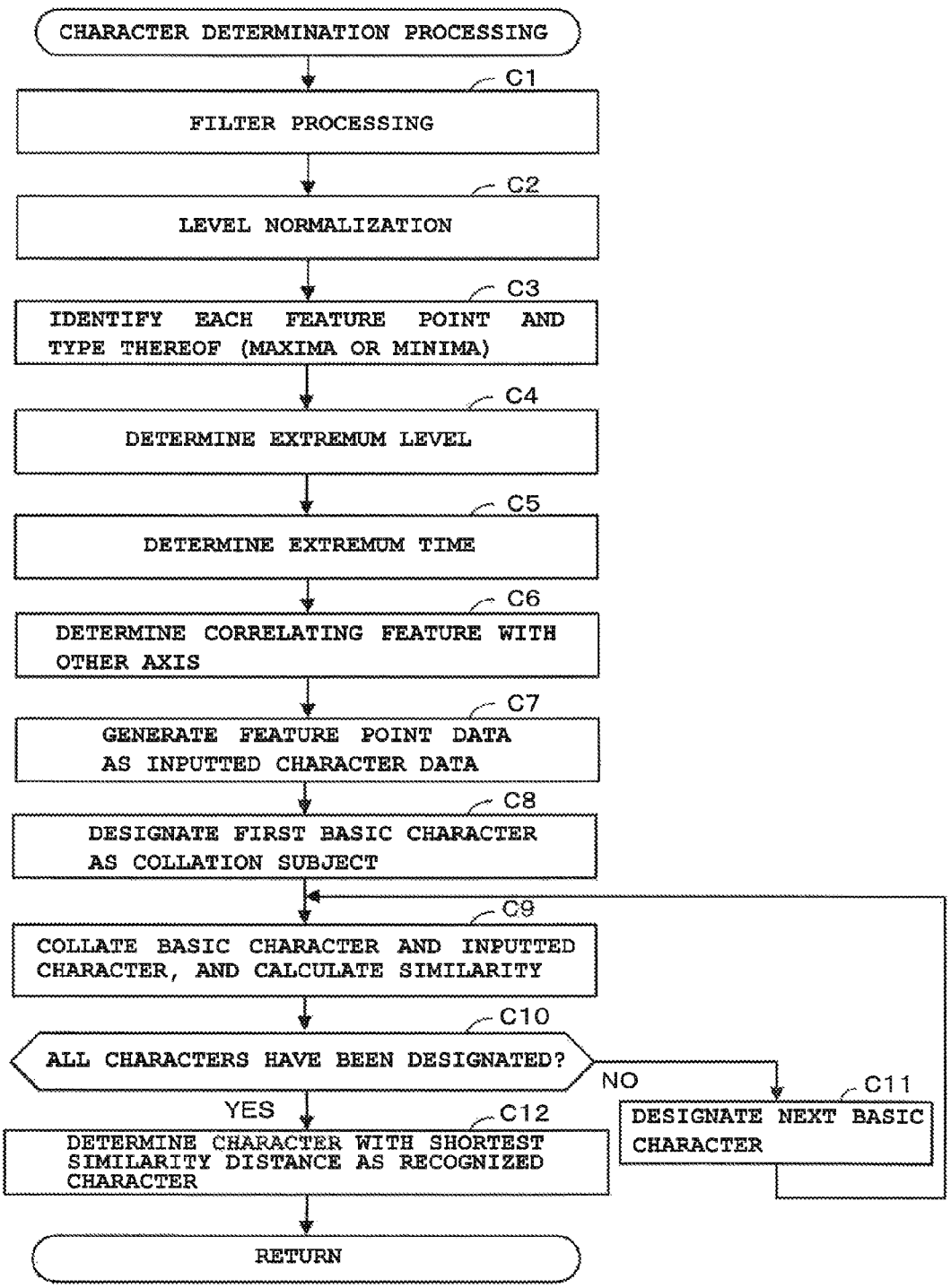
FIG. 7 is a flowchart for describing character determination processing in detail (Step B9 in FIG. 6)

Here, before the flowcharts shown in FIG. 6 and FIG. 7 are described, operation procedures and an operation method used when a user performs a handwriting input of a character will be described with reference to FIG. 5.

First, after turning ON the character recognition function, the user holds the digital camera body (housing) in a hand and writes a character by moving the housing in a spatial plane. Specifically, before starting to write the character, the user holds the housing still (Step A1 in FIG. 5), and then slowly and smoothly moves the housing to a position where the writing of the character is started (Step A2).

Next, the user writes the character in a two-dimensional plane parallel to the direction of gravitational force. While inputting the character, the user moves the housing for each stroke without significantly changing the position of the housing. The housing is moved smoothly from the end point of one stroke to the starting point of the next stroke without being stopped, and so the character is written continuously and smoothly in a unicursal manner (Step A3). When the writing of one character is completed, the user again holds the housing still (Step A4). Then, the user slowly and smoothly moves the housing to a position where the writing of the next character is started (Step A5), and starts to write the next character. Hereafter, until the character input is completed (NO at Step A6), the user repeatedly returns to above-described Step A3 to continue the handwriting operation, and thereby performs the handwriting input of a plurality of characters sequentially.

FIG. 6 is a flowchart outlining operations of the characteristic portion of a first embodiment from among all of the operations of the digital camera, which is performed when the character recognition function is turned ON and character recognition is started. Note that, after exiting the flow in FIG. 6, the procedure returns to the main flow (not shown) of the overall operation.

First, the control section 1 performs processing to cancel acceleration corresponding to gravitational force from measurement results from the acceleration sensor 7 (Step B1). That is, a measurement result (acceleration component) in the vertical direction, for example, includes upward 1 G as gravitational force acceleration. Therefore, gravitational force acceleration based on the position of the housing (substantially the same position) is measured before the writing of a character is started, and temporarily stored in the RAM of the storage section 3, in preparation for subtracting upward 1 G from a measurement result every time acceleration is measured.

Then, the control section 1 judges whether or not the writing of a character has been started based on whether or not acceleration composite vectors of two components whose sizes are equal to or more than a predetermined threshold value have continued for a predetermined amount of time (predetermined number of times) or more (Step B2). Here, the user slowly and smoothly moves the housing to the writing start position of the character so that two acceleration composite vectors whose sizes are equal to or more than a predetermined threshold value do not continue for a predetermined amount of time or more, or in other words, acceleration composite vectors of a predetermined threshold value or more do not continue for a predetermined amount of time (predetermined number of times) or more, and then starts the writing of the character. As a result, the control section 1 detects that acceleration composite vectors of a predetermined threshold value or more have continued for a predetermined amount of time (predetermined number of times) or more (YES at Step B2).

When the start of the writing of the character is detected as described above, the control section 1 starts the measuring operation of a single-character input timer (not shown) for measuring an input time for one character (Step B3). Next, the control section 1 proceeds to processing for storing acceleration data that is generated during the input of one character (Step B4), and stores the acceleration of two components, from which acceleration corresponding to gravitational force has been canceled by the gravitational force acceleration being subtracted from measurement results from the acceleration sensor 7, in the RAM of the storage section 3 as a measurement result at the time of the start of writing. Subsequently, the control section 1 judges whether or not the user has completed the writing of one character based on whether or not acceleration composite vectors of less than a predetermined threshold value have continued for a predetermined amount of time (predetermined number of times) or more (Step B5). In this instance, the user continuously moves the housing until the writing of one character is completed, while maintaining the position of the housing. That is, the user moves the housing such as to draw a smooth trajectory from the end point of one stroke to the starting point of the next stroke, so as to write the character in a unicursal manner without stopping. Then, when the writing of one character is completed, the user stops moving the housing. Accordingly, when the user finishes writing one character, the control section 1 detects that acceleration composite vectors of less than the predetermined threshold value have continued for the predetermined amount of time (number of times) or more (YES at Step B5).

Conversely, when the user is still inputting one character, the control section 1 detects that acceleration composite vectors of the predetermined threshold value or more have continued for the predetermined amount of time (number of times) or more (NO at Step B5). Therefore, the control section 1 returns to above-described Step B4 to repeat the processing for storing acceleration data that is generated during the input of one character in the RAM of the storage section 3, whereby the operation for storing measurement results from the acceleration sensor 7 is performed, for example, about 100 times per second. As a result, acceleration data of each component sequentially acquired during the period from the start to the end of the writing of one character are sequentially stored in the RAM of the storage section 3 as a series of acceleration data that is temporally continuous from the first stroke of the character to the last stroke including acceleration between strokes.

When the completion of the writing of the character is detected (YES at Step B5), the control section 1 stops the measuring operation of the single-character input timer described above (Step B6), and then judges whether or not the length of the measured time (input time for one character) is equal to or more than a predetermined threshold value (which is, for example, time required to input a simple character such as the kanji for "one") (Step B7). When judged that the length of the measured time is less than the threshold value (NO at Step B7), the control section 1 deletes the current series of data stored in the RAM of the storage section 3 to cancel the current measurement results from the acceleration sensor 7 (Step B8), and returns to Step B2 to detect the start of the writing of a character. Conversely, When judged that the length of the input time for one character is equal to or more than the predetermined threshold value (YES at Step B7), the control section 1 performs character determination processing to perform character recognition based on the series of acceleration data for one character stored in the RAM of the storage section 3 (Step B9).

FIG. 7 is a flowchart for describing the character determination processing in detail (Step B9 in FIG. 6).

First, the control section 1 performs filter processing on the measurement results (acceleration of two components) acquired by the acceleration sensor 7 while the user is inputting one character (Step C1). That is, the control section 1 applies a low-pass filter on the acceleration of the two components to remove high-frequency components of the acceleration attributed to noise from the acceleration sensor 7 itself or a slight hand movement, from the acceleration data acquired during the period from the start to the end of the writing of one character. Next, the control section 1 performs level normalization on the acceleration data for one character (Step C2). Generally, in a device that performs character recognition based on changes in acceleration, the magnitude of acceleration differs between when a character is written slowly and when a character is written quickly, even when the size of the character is the same. In order to prevent this from affecting the subsequent character recognition processing, when acceleration while the housing is standing still is "0" for both components, the control section 1 retrieves the acceleration with the greatest absolute value from the acceleration data of the two components in one character, and performs level normalization by multiplying the acceleration of the two components uniformly by the same coefficient so that the absolute value is the same in any character.

Next, the control section 1 identifies each feature point for each component from the acceleration data for one character, and identifies the type thereof (Step C3). In this instance, the control section 1 retrieves a local maximum point (maxima) and a local minimum point (minima) in each acceleration data of the two components, identifies the maxima and the minima as feature points, and identifies the type thereof (maxima or minima). Then, the control section 1 determines an acceleration level (extremum level) after normalization for each feature point (Step C4), and determines time (extremum time) to reach the extremum when the start of the writing of one character is time "0" (Step C5). Next, the control section 1 determines, for each feature point, a correlating feature with the other axis (Step C6). In this instance, the control section 1 determines, for each feature point of one axis, time ratio indicating a relative position with reference to the inter-extrema range of the other axis, as shown in FIG. 2. Alternatively, the control section 1 determines, for each feature point of one axis, level ratio indicating a relative size with reference to the inter-extrema range of the other axis, as shown in FIG. 3.

In this way, the control section 1 identifies each feature point for each component from the acceleration data for one character. In addition, the control section 1 generates feature point data including "type of extremum", "extremum level", "extremum time", and "correlating feature with other axis (ratio)" for each feature point as inputted character data (Step C7). Then, the control section 1 designates the first basic character from among the basic characters stored in the recognition dictionary memory DM as a collation subject (Step C8), and calculates similarity between the designated basic character data and the inputted character data while collating them (Step C9).

FIG. 8A to FIG. 8J show an example of process for collating basic character data and inputted character data. In the example in FIG. 8A to FIG. 8J, an instance is shown in which the number of extrema of a certain component of a certain basic character is three, from the 0th extremum to the k-th extremum (2nd extremum), and the number of extrema of a certain component of inputted character is five, from the 0th extremum to the k-th extremum (4th extremum). In addition, "basic F(j,k)" indicates "K(j,k)" "R(j k)" "L(j,k)", and "T(j,k)" as "type of extremum", "correlating feature with other axis (ratio)", "extremum level", and "extremum time" of the basic character data as shown in FIG. 4. "Input F(j,k)" indicates "type of extremum", "correlating feature with other axis (ratio)", "extremum level", and "extremum time" of the inputted character data.

The number of extrema of the inputted character is greater than the number of extrema of the basic character as described above because of the effects of a slight movement of the hand holding the housing, etc. In this instance, collation is performed such that the sequence of the extrema is maintained. As combinations for this collation, the following ten collation patterns in FIG. 8A to FIG. 8J are conceivable. Among the ten collation patterns in which the sequence of the extrema is not changed, the control section 1 compares "correlating feature with other axis (ratio)" of the basic character with that of the inputted character and compares "extremum level" of the basic character with that of the inputted character on a condition that the types of the extrema are the same, so as to calculate the average of the differences and thereby select the collation pattern having the smallest difference from among FIG. 8A to FIG. 8J. After performing collation such as this for each component, the control section 1 calculates the average of differences from the differences of feature points of each component, and determines the average value as similarly to the basic character (similarity distance).

After determining similarity (similarity distance) for one character, the control section 1 judges whether or not all the basic characters in the recognition dictionary DM have been designated (Step C10). When judged that not all the characters have been designated (NO at Step C10), the control section 1 designates the next basic character (Step C11), and collates the designated basic character data and the inputted character data to calculate similarity between them (Step C9). Hereafter, the control section 1 repeats the processing until all the characters are designated. When similarity distances are determined for all the basic characters (YES at Step C10), the control section 1 selects the character with the smallest average value (the character with the shortest similarity distance) as a recognized character (input candidate (Step C12).

When the character determination processing is completed as described above (Step B9 in FIG. 6), the control section 1 displays the recognized character determined by the character determination processing in the display section 5 as an input candidate (Step B10). Then, in this state, the control section 1 judges whether or not an operation indicating a next candidate has been performed (Step B11), and whether or not the character recognition function has been turned OFF, or in other words, whether or not the completion of character input has been indicated by user operation (Step B12). When judged that an operation indicating a next candidate has been performed (YES at Step B11), the control section 1 reads out the next candidate (Step B13) and displays the next candidate on the display section 5 as an input candidate (Step B10). When judged that the completion of character input has not been indicated (NO at Step B12), the control section 1 returns to above-described Step B2 and repeats the above-described operation to perform character recognition for a next handwritten character. When judged that the completion of character input has been indicated (YES at Step B12), the flow in FIG. 6 is completed at this point.

As described above, in the first embodiment, when recognizing an operation for writing a character, which is performed by the housing including the acceleration sensor 7 while being moved in a spatial plane, based on measurement results from the acceleration sensor 7, the control section 1 determines from the start of the writing of one character to the end of the writing of the character based on acceleration data of components associated with each axis of the acceleration sensor 7, and acquires acceleration data for each component which has been generated during the writing as a series of acceleration data that is temporally continuous from the first stroke of the character to the last stroke of the character including acceleration between strokes. Then, the control section 1 identifies, for each component, a plurality of feature points in the series of acceleration data, and after generating feature point data, which includes these feature points, for each component as inputted character data, collates the inputted character data with the basic character data. Accordingly, in this character recognition device, smooth and reliable character recognition of a character written in a plane can be performed based on measurement results from the acceleration sensor 7. Thus, the usefulness of the character recognition device is high.

That is, unlike character recognition devices that integrate acceleration to determine a movement trajectory, the character recognition device of the present invention uses acceleration data, and uses the acceleration as it is for character recognition. Therefore, although the effect of gravitational force cannot be avoided, the character recognition device can effectively cope with slight changes or fluctuations in the gravitational force direction which are caused by changes in the position of the housing during character input. Accordingly, the character recognition device achieves robust character recognition, and does not require a sensor other than the acceleration sensor, such as a gyroscope. In addition, the character recognition device does not use a character recognition method that requires the separation of elements (strokes) constituting a character, and therefore does not require complicated and difficult operations and movements such as pen-up and pen-down in a situation where a character is written in the air, thereby enabling natural, smooth, and quick character input. Moreover, since the basic characters are composed of a plurality of feature points as in the case of inputted characters, the dictionary capacity may be small. Thus, the usefulness of the character recognition device is high.

In addition, the character recognition device excludes acceleration data generated between the end of the writing of one character and the start of the writing of the next character from a series of acceleration data. Therefore, acceleration data for one character can be easily identified.

Moreover, the character recognition device determines the start and the end of the writing of one character based on whether or not the size of a composite vector in the acceleration of each orthogonal component acquired by a measurement result from the acceleration sensor 7 being separated in a plane is equal to or more than a predetermined threshold value, and whether or not a composite vector whose size is equal to or more than the predetermined threshold value has continued for a predetermined amount of time or more. Therefore, when using the character recognition device, the user is only required to hold the housing still before starting to write a character, and slowly and smoothly move the housing to the writing start position of the character. Then, when the writing of the character is completed, the user again holds the housing still. That is, the character recognition device can determine the start and the end of the writing of one character by a very natural operation performed by the user.

Furthermore, the character recognition device identifies a maxima that is a local maximum point and a minima that is a local minimum point as feature points in each acceleration data of each component, and determines the type of an extremum and an extremum level for each feature point, thereby generating inputted character data. As a result of this configuration, the character recognition device can acquire inputted character data adequately expressing the movement trajectory of the housing even from a small amount of data.

Still further, the character recognition device determines time to reach an extremum from the start of the writing of a character as extremum time, and generates inputted character data including the type of an extremum and an extremum level in addition to the extremum time. As a result of this configuration, when collating inputted character data and the basic character data, the character recognition device can identify each feature point based on extremum time and perform infallible collation.

Yet still further, for each feature point in acceleration data associated with one axis, the character recognition device determines data indicating correlation with a feature point in acceleration data associated with the other axis as a correlating feature with the other axis, and generates inputted character data including the type of an extremum, an extremum level, and extremum time in addition to the correlating feature with the other axis. As a result of this configuration, the character recognition device is resistant to changes in speed during the input of one character, and is capable of further infallible character recognition.

Yet still further, a correlating feature with the other axis is either a time ratio indicating a relative position or a level ratio indicating a value with reference to a inter-extrema range from a maxima to a minima or from a minima to a maxima in acceleration data associated with the other axis, and therefore is suitable as a correlating feature with the other axis.

Second Embodiment

A second embodiment of the present invention will hereinafter be described with reference to FIG. 9A to FIG. 12.

In the above-described first embodiment, each feature point is identified for each component from the acceleration data of the components of two axes that are orthogonal in a spatial plane, and feature point data including the fields "type of extremum", "extremum level", "extremum time", and "correlating feature with other axis (ratio)" is determined as inputted character data for each feature point. However, in the second embodiment, the two axes that are orthogonal in a spatial plane are each rotated by a predetermined angle (45 degrees) in the same respective direction, thereby converting the acceleration data for each component acquired from the acceleration sensor 7 to acceleration data on a plane coordinate system after rotation. The above-described feature point data is also acquired from the acceleration data after rotation. Note that, although feature point data after rotation includes the fields "type of extremum", "extremum level", "extremum time", and "correlating feature with other axis (ratio)" for each feature point, "type of extremum" may be omitted.

In the second embodiment, feature point data including a plurality of feature points identified from acceleration data before rotation (original feature points) and a plurality of feature points identified from acceleration data after rotation (feature points after rotation) is generated as inputted character data. Furthermore, as in the case of the inputted character data, the basic character data also has a data configuration including original feature points and feature points after rotation. Sections that are basically the same or have the same name in both embodiments are given the same reference numerals, and therefore explanations thereof are omitted. Hereafter, the characteristic sections of the second embodiment will mainly be described.

Figure 9A:
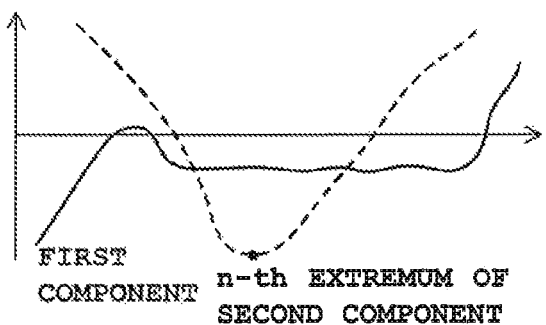
FIG. 9A and FIG. 9B are waveform diagrams indicating acceleration data of a certain character for describing a second embodiment.
Figure 9B:
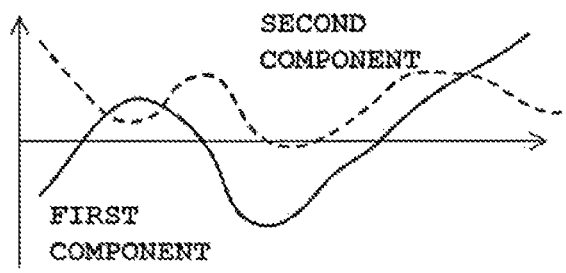

FIG. 9A and FIG. 9B are waveform diagrams showing the acceleration data of a certain character to describe the second embodiment. FIG. 9A shows a waveform before each axis in a spatial plane is rotated by 45 degrees in the same respective direction. FIG. 9B shows a waveform after each axis in a spatial plane is rotated by 45 degrees in the same respective direction.

As shown in FIG. 9A, in some cases, amplitude change is small in the acceleration data of a certain character. In the example in FIG. 9A, the amplitude in the acceleration data of the first component of the character shows little change, and the acceleration data of the second component is a simple waveform with little change (featureless waveform). In such instances, the correlating feature with the other axis (ratio) becomes unclear, and the collation of ratio cannot be performed. However, as shown in FIG. 9B, when each axis is rotated by 45 degrees in the same respective direction, the acceleration data of the first and second components show numerous changes, and the correlating feature with the other axis (ratio) becomes clear.

Figure 10:
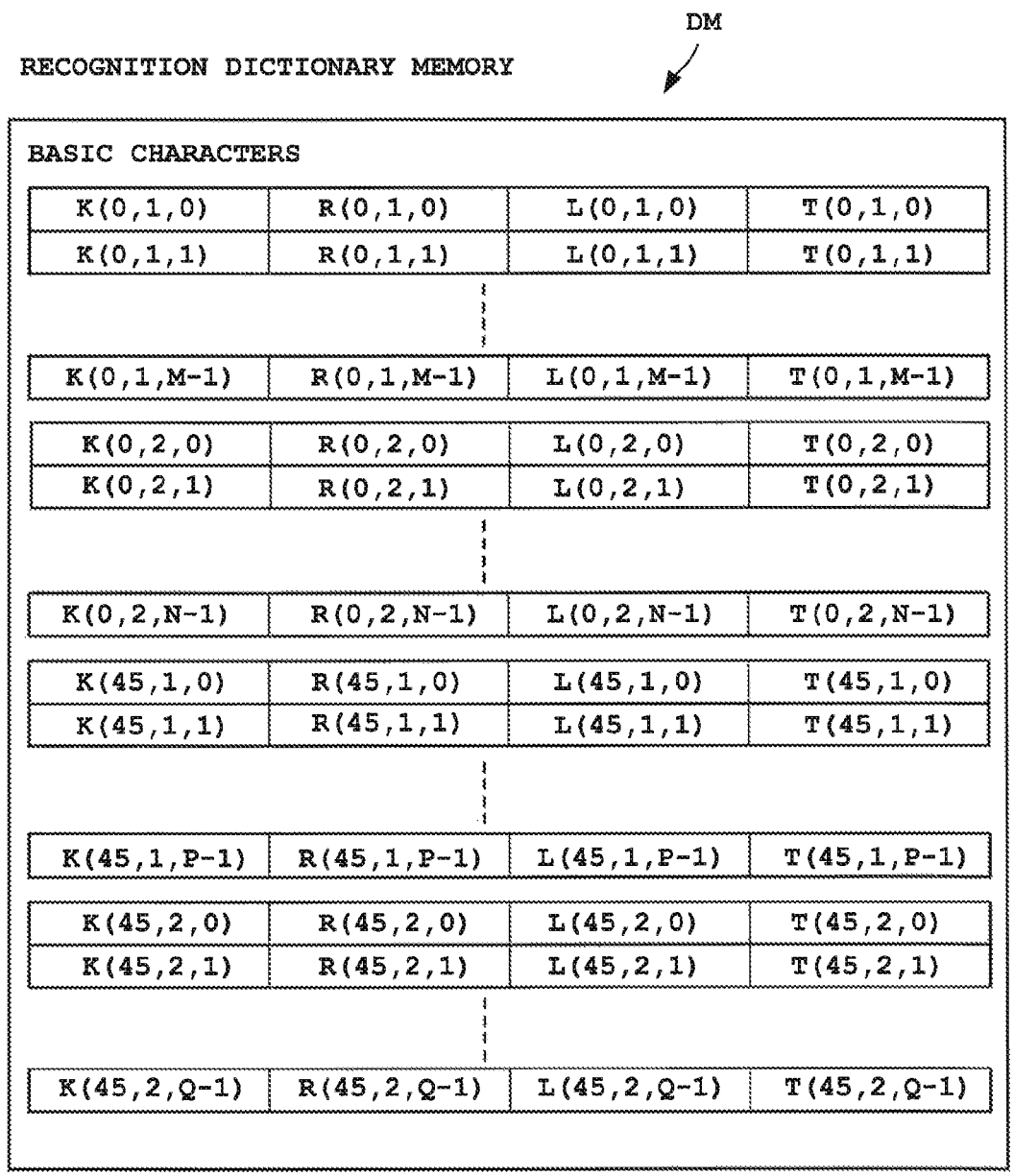
FIG. 10 is a diagram for explaining basic character data in the recognition dictionary memory DM of the second embodiment.

FIG. 10 is a diagram for explaining basic character data in the recognition dictionary memory DM of the second embodiment.

The recognition dictionary memory DM stores basic character data for each character for use in character recognition. The basic character data is composed only of feature points that always appear when a character is written, and is feature point data having a plurality of feature points associated with the components of two orthogonal axes, and a plurality of feature points after the axes have been rotated by 45 degrees. The feature point data includes the field data "K(i,j,k)", "R(i,j,k)" "L(i,j,k)", and "T(i,j,k)" for each feature point of each component. The field data "K(i,j,k)" indicates the type (maxima or minima) of a k-th extremum in the acceleration of a j-th component on a rotated coordinate system in which the axes are rotated by i-degrees.

The field data "R(i,j,k)" indicates a correlating feature with the other axis (time ratio or level ratio) of the same extremum. The field data "L(i,j,k)" indicates the extremum level of the same extremum. The field data "T(i,j,k)" indicates the extremum time of the same extremum. As described above, the basic character data of the second embodiment includes the data of a total of four components, with the components of the two axes before rotation as a first component and a second component, and the components of the two axes after rotation as a third component and a fourth component.

The example in FIG. 10 shows an instance in which the number of extrema in the acceleration of a first component is M. The recognition dictionary memory DM has the fields "K(0,1,0)", "R(0,1,0)", "L(0,1,0)", and "T(0,1,0)" in association with the 0th extremum of the first component, and the fields "K(0,1,M−1)", "R(0,1,M−1)", "L(0,1,M−1)", and "T(0,1,M−1)" in association with the M-th extremum. The example in FIG. 10 also shows an instance in which the number of extrema in the acceleration of the second component is N. The recognition dictionary memory DM has the fields "K(0,2,0)", "R(0,2,0)", "L(0,2,0)", and "T(0,2,0)" in association with the 0th extremum of the second component, and the fields "K(0,2,N−1)", "R(0,2,N−1)", "L(0,2,N−1)", and "T(0,2,N−1)" in association with the N-th extremum.

The example in FIG. 10 also shows an instance in which the number of extrema in the acceleration of a first component rotated by 45 degrees is P. The recognition dictionary memory DM has the fields "K(45,1,0)", "R(45,1,0)", "L(45,1,0)", and "T(45,1,0)" in association with the 0th extremum of the first component, and the fields "K(45,1,P−1)", "R(45,1,P−1)", "L(45,1,P−1)", and "T(45,1,P−1)" in association with the P-th extremum. The example in FIG. 10 further shows an instance in which the number of extrema in the acceleration of the second component rotated by 45 degrees is Q. The recognition dictionary memory DM has the fields "K(45,2,0)", "R(45,2,0)", "L(45,2,0)", and "T(45,2,0)" in association with the 0th extremum of the first component, and the fields "K(45,2,Q−1)", "R(45,2,Q−1)", "L(45,2,Q−1)", and "T(45,2,Q−1)" in association with the Q-th extremum. The numbers of extrema M, N, P, and Q are not correlated and varies depending on the character.

Figure 11:
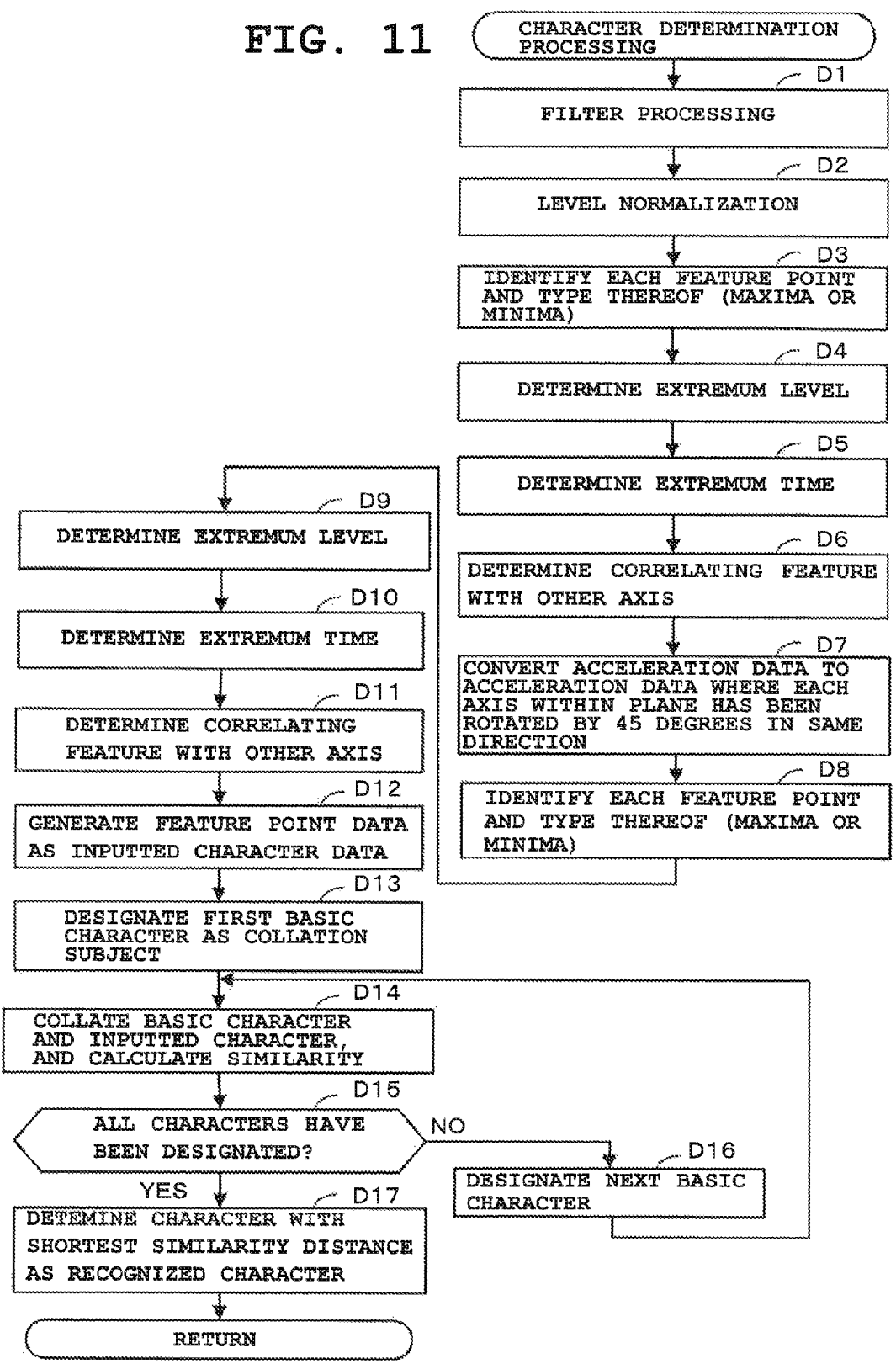
FIG. 11 is a flowchart for describing in detail character determination processing (Step B9 in FIG. 6) in the second embodiment.

FIG. 11 is a flowchart for describing in detail the character determination processing of the second embodiment (Step B9 in FIG. 6).

First, the control section 1 performs processing corresponding to Step C1 to Step C6 in FIG. 7 that is similar to the above-described processing of the first embodiment. That is, the control section 1 performs filter processing on measurement results acquired by the acceleration sensor 7 while the user is inputting one character (Step D1), and performs level normalization on the acceleration data for one character (Step D2). Next, the control section 1 retrieves a local maximum point (maxima) and a local minimum point (minima) in each acceleration data of the two components, identifies the maxima and the minima as feature points, and determines the type thereof (maxima or minima) (Step D3). Then, the control section 1 determines an extremum level for each feature point (Step D4), an extremum time (Step D5), and a correlating feature with the other axis (Step D6).

As described above, the control section 1 identifies each feature point for each component from acceleration data for one character, and determines "type of extremum", "extremum level", "extremum time", and "correlating feature with other axis (ratio)" for each feature point as inputted character data. Then, the control section 1 converts the acceleration data for one character, on which filter processing has been performed at above-described Step D1 and level normalization has been performed at above-described Step D2, to acceleration data on a rotated coordinate system by rotating the two axes that are orthogonal in a plane by a predetermined angle (45 degrees) in the same respective direction (Step D7).

FIG. 12 is a diagram showing a rotation conversion formula, in which "rotation matrix" is used to convert acceleration data for one character to acceleration data on a rotated coordinate system. In this instance, the control section 1 determines the acceleration of a first component on a rotated coordinate system when the acceleration of the first axis (first component) on the original plane coordinate system is rotated by 45 degrees, and determines the acceleration of the second component on the rotated coordinate system when the acceleration of the second axis (second component) on the original plane coordinate system is rotated by 45 degrees in the same respective direction.

Next, the control section 1 identifies each feature point for each component from the acceleration data for one character after the rotation of 45 degrees, and determines the type thereof (Step D8). Then, for each feature point, the control section 1 determines an acceleration level (extremum level) after normalization at that feature point (Step D9), and determines time (extremum time) to reach the extremum when the start of the writing of the character is time "0" (Step D10). Moreover, the control section 1 determines, for each feature point, a correlating feature with the other axis (Step D11). Then, the control section 1 generates feature point data including the plurality of feature points identified as described above from the acceleration data before rotation (original feature points) and the plurality of feature points identified as described above from the acceleration data after rotation (feature points after rotation) as inputted character data (Step D12). Then, the control section 1 designates the first basic character from among the basic characters stored in the recognition dictionary memory DM as a collation subject (Step D13), and calculates similarity between the designated basic character data and the inputted character data while collating them, thereby performing character recognition (Step D14 to D17).

As described above, the control section 1 according to the second embodiment converts acceleration data for each component which has been acquired by the acceleration sensor 7 to acceleration data for each component associated with each axis on a rotated coordinate system by rotating each axis by a predetermined angle in the same respective direction. The control section 1 then generates feature point data for each component including a plurality of feature points in the acceleration data acquired from the acceleration sensor 7 (original feature points) and a plurality of feature points in the acceleration data that has been converted by being rotated (feature points after rotation) as inputted character data, and collates the inputted character data and the basic character data. As a result of this configuration, the character recognition device is able to appropriately perform character recognition for any character. That is, for example, even when the acceleration data during input of one character is a simple waveform with little change (featureless waveform), the acceleration data becomes a waveform with numerous changes as a result of being rotated by a predetermined angle (45 degrees). Accordingly, acceleration data in which the correlating feature with the other axis is clear can be acquired, and character recognition can be appropriately performed.

According to the second embodiment, an instance is shown in which each axis is rotated 45 degrees in the same respective direction. However, a configuration may be applied in which feature points are identified on a rotated coordinate system that has been rotated by 30 degrees and by 60 degrees. In the second embodiment, the basic character data has data of a total of four components, with the components of the two axes before rotation as a first component and a second component, and the components of the two axes after rotation as a third component and a fourth component. However, in the case of the above configuration, the basic character data has data of a total of six components as a result of the axes being rotated by 30 degrees and by 60 degrees.

During the process of collating the basic character data and inputted character data in the above-described first embodiment, in the case of the instances shown in FIG. 8A to FIG. 8J, the collation pattern with the smallest difference is selected while collation using the 10 types of collation patterns is performed, so that similarity with the basic character is determined. However, a configuration may be applied in which collation with unnecessary collation patterns is omitted. In this case, an importance level for each feature point in inputted character data may be determined in relation to feature points on both sides, and character recognition may be performed with reference to the importance level for each feature point.

Figure 8A:
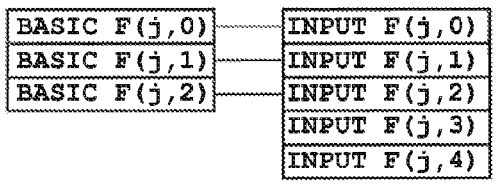
FIG. 8A to FIG. 8J are diagrams showing an example of the process of collation between basic character data stored for use in character recognition and inputted character data.
Figure 8B:
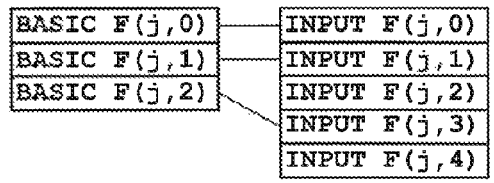
Figure 8C:
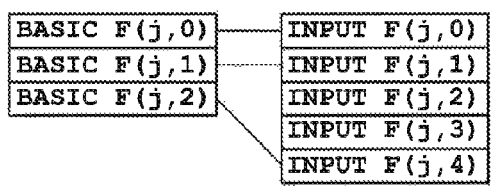
Figure 8D:
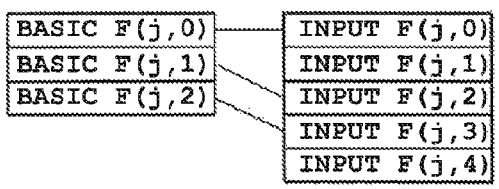
Figure 8E:
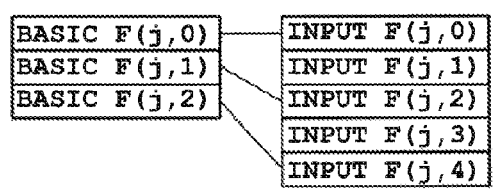
Figure 8F:
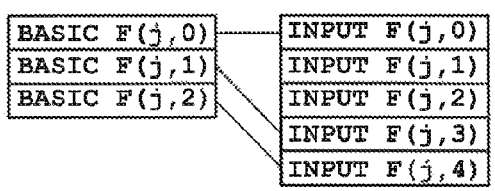
Figure 8G:
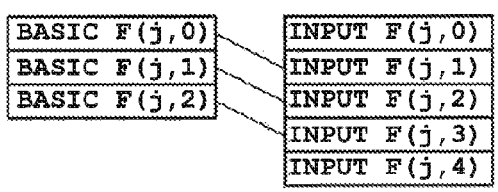
Figure 8H:
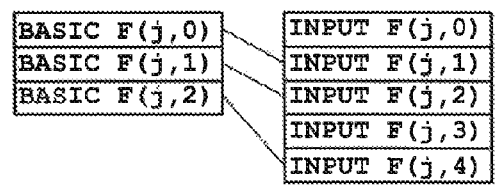
Figure 8I:
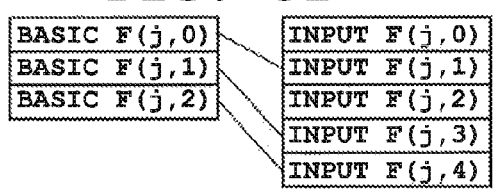
Figure 8J:
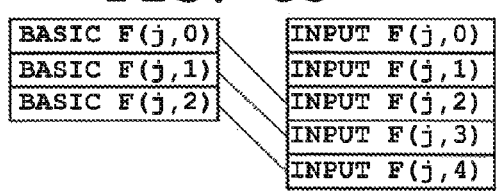

For example, when the pattern in FIG. 8A is calculated as having the smallest difference among the combinations of FIG. 8A to FIG. 8J, "input F(j,3)" and "input F(j,4)" are not included in the feature points of the basic character data. However, if "input F(j,3)" and "input F(j,4)" are features required as elements constituting the character, selecting the pattern in FIG. 8A as the collation pattern with the smallest difference is not preferable in terms of character recognition. In such instances, extremum depth is defined as shown in FIG. 13 so that the importance level of each feature point is evaluated for all feature points of an inputted character. In the example in FIG. 13, when the extremum depth is defined as a sum of level differences with the extrema on both sides, the depth of the n+1th extremum is a+b, the depth of the n+2th extremum is b+c, and the depth of the n+3th extremum is c+d.

Here, the greater the extremum depth is, the more important the feature point is. When an extremum whose extremum depth defined as described above is greater than a predetermined threshold value is determined to be an important feature point, and when, for example, the number of important feature points (four) of a certain component of the inputted character data is greater than the number of feature points (three) of the same component of a certain basic character data as shown in FIG. 14A, a judgment can be made that the inputted character is not the basic character, without the similarity distance with the basic character being calculated.

When the configuration is applied in which an importance level is determined for each feature point in inputted character data in relation to feature points on both sides, and character recognition is performed with reference to the importance level for each feature point, character recognition can be efficiently and infallibly performed.

In the configuration where similarity between the basic character data and inputted character data is calculated and the basic character with the highest degree of similarity is determined to be a recognized character, when the number of feature points of a certain component in inputted character data which have a high importance level is greater than the number of feature points of the same component in the basic character data, the control section 1 judges that the basic character is not the recognized character without calculating similarity with the basic character. Therefore, character recognition can be more efficiently and reliably performed.

Not only a configuration in which character recognition is performed based on the importance level of a feature point, but also a configuration may be applied in which a judgment that a basic character is not a recognized character is made by simply comparing the number of feature points between the inputted character data and the basic character data. For example, when a configuration is applied in which, when the number of feature points of a certain component in inputted character data is less than the number of feature points of the same component in a certain basic character data, such as when the number of feature points of inputted character is "four" and the number of feature points of a basic character is "six" as shown in FIG. 14B, a judgment is made that the basic character is not the recognized character without similarity with the basic character being calculated, character recognition can be efficiently and reliably performed without an importance level being determined.

In addition, the basic character data according to the first and second embodiments described above is composed of "type of extremum" "extremum time (temporal position)", "extremum level (acceleration magnitude)", and "correlating feature with other axis (ratio)" However, the basic character data is not limited thereto and may have other fields. For example, a configuration may be applied in which a coefficient (similarity distance coefficient) used to calculate similarity from the difference between the feature point of the basic character data and the feature point of inputted character data is included for each feature point, as another field. Alternatively, a configuration may be applied in which a collation flag indicating whether or not to perform collation between a predetermined field in the basic character data and a predetermined field in inputted character data is included for each feature point constituting the basic character data, as another field.

FIG. 15 is a diagram of the configuration of basic character data adapted to the 45-degree rotation in the recognition dictionary memory DM. In the example in FIG. 15, the basic character data has "Rd(i,j,k)" as a similarity distance coefficient corresponding to "R(i,j,k)" of "correlating feature with other axis (ratio)", and "Ld(i,j,k)" as a similarity distance coefficient corresponding to "L(i,j,k)" of "extremum level", for each feature point. In addition, the basic character data has "Rf(i,j,k)" as a collation flag corresponding to "R(i,j,k)" of "correlating feature with other axis (ratio)" and "Lf(i,j,k)" as a collation flag corresponding to "L(i,j,k)" of "extremum level".

When the configuration is applied in which the similarity distance coefficients "Rd(i,j,k)" and "Ld(i,j,k)" are included in the basic character data, the feature point data of the basic character can be adjusted in further detail, and the rate of the recognition of a character can be increased. That is, in the calculation of similarity, rather than the average of difference being simply calculated, the basic character data includes the different similarity distance coefficients Rd and Ld, and calculation is performed using a lower coefficient for a feature point whose difference can be easily determined, and a higher coefficient for a feature point whose difference cannot be easily determined, whereby a more appropriate degree of similarity is determined.

When a configuration is applied in which the collation flag indicating whether or not to perform collation between a predetermined field in the basic character data and a predetermined field in inputted character data is included for each feature point constituting the basic character data, such as when a configuration is applied in which a flag is provided for each feature point of a basic character and, regarding a feature point whose "correlating feature with other axis (ratio)" and "extremum level" significantly change because of the characteristics of the character, the control section 1 recognizes that the feature point of the basic character of that character is not required to be used in calculation for the similarity distance, a more accurate similarity distance can be calculated.

Figure 16A:
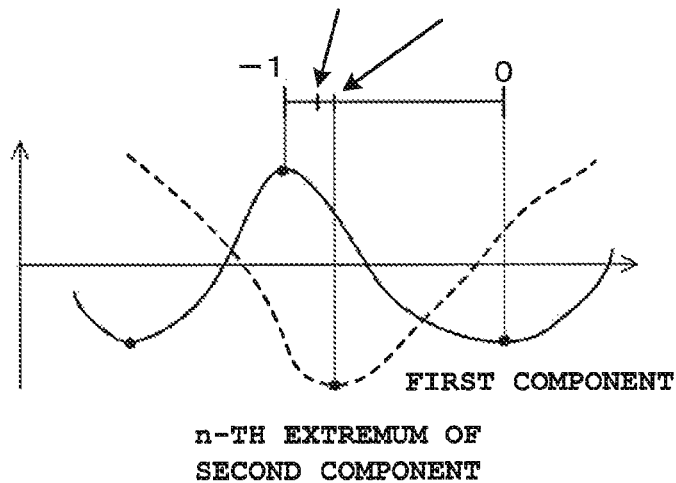
FIG. 16A and FIG. 16B are diagrams of a variation example of the first and second embodiments, which is used to explain basic character data.
Figure 16B:
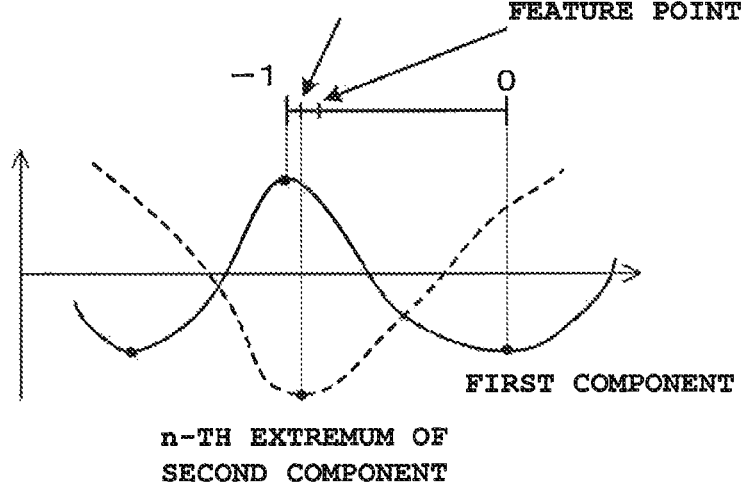

In addition, a configuration may be applied in which two types of similarity distance coefficients Rd are included in the basic character data and, when "correlating feature with the other axis (time ratio or level ratio) R" of an n-th extremum of a certain component (second component) of inputted character is shifted to come after the ratio R of a basic feature point, or in other words, "correlating feature with the other axis (time ratio or level ratio) R" of an n-th extremum of the same component of the basic character as shown in FIG. 16A, or is shifted to come before the ratio R of the basic feature point as shown in FIG. 16B, a different similarity distance coefficient Rd is used. Similarly, a configuration may be applied in which two types of similarity distance ratios Ld are included in the basic character data, and a different similarity distance ratio Ld is used depending on whether the extremum level L of inputted character is lower or higher than the ratio L of the basic feature point.

Figure 17:
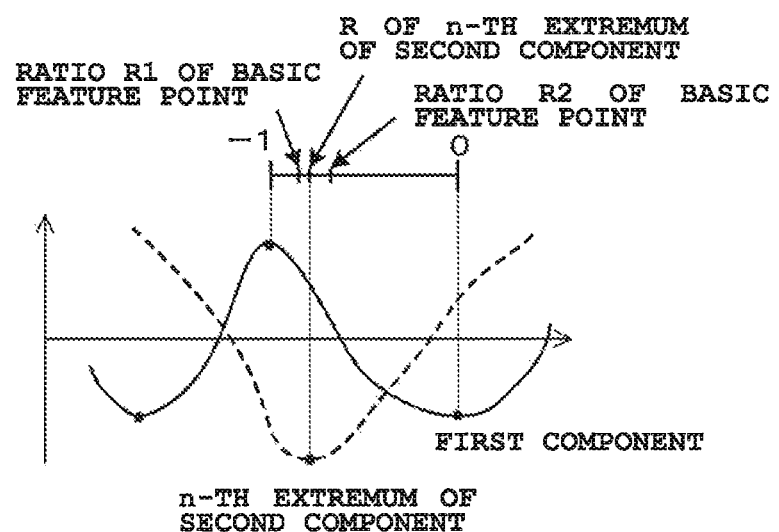
FIG. 17 is a diagram of a variation example of the first and second embodiments used to explain the basic character data.

In addition, a configuration may be applied in which data indicating a range is included in the basic character data as a ratio indicating "correlating feature with the other axis" and, when collating a ratio indicating the correlating feature with the other axis in the basic character data and a ratio indicating "correlating feature with the other axis" in inputted character data, the control section 1 judges whether or not the ratio of the inputted character is found within the range of the ratio of the basic character side. That is, a configuration may be applied in which the basic character data includes, rather than data indicating a point, data indicating a range between a ratio R1 and a ratio R2 as shown in FIG. 17 as the ratio R of the basic feature point, and when "correlating feature with the other axis (time ratio or level ratio) R" of the n-th extremum of a certain component (second component) of inputted character is within the range, the similarity distance is "0", and when "correlating feature with the other axis (time ratio or level ratio) R" is outside of the range, the similarity distance exceeds "0". As a result of the basic character data including data indicating range as the ratio R of the basic feature point, a more suitable similarity distance can be acquired.

Third Embodiment

A third embodiment of the present invention will hereinafter be described with reference to FIG. 18 to FIG. 22.

Figure 18:
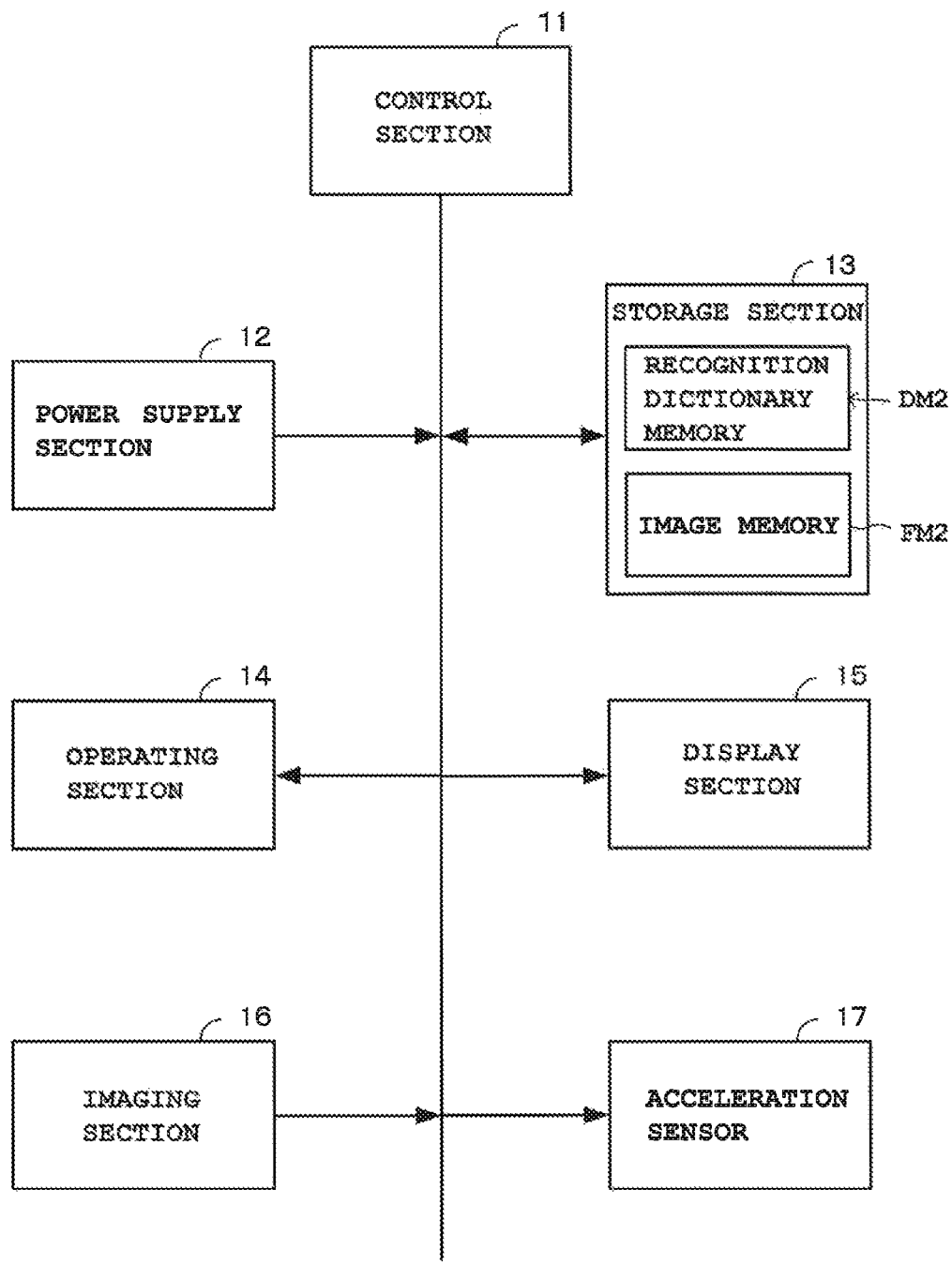
FIG. 18 is a block diagram showing basic components of an imaging apparatus (digital camera) having a character recognition function, in which the present invention has been applied as a character recognition device according to a third embodiment.

The third embodiment is an example in which the present invention has been applied as a character recognition device to an imaging apparatus (digital camera) having a character recognition function. FIG. 18 is a block diagram showing basic components of the digital camera having a character recognition function.

This digital camera is a portable compact camera having a character recognition function for recognizing a character written in a spatial plane in addition to basic functions such as an imaging function and a clock function, and operates with a control section 11 serving as a core. The control section 11 (acquisition section, selection section, plane identification section, first conversion section, character recognition section, identification section, second conversion section, and determination section), which operates by receiving power supply from a power supply section 12 including a secondary battery, controls the overall operations of the digital camera in accordance with various programs stored in a storage section 13. central processing unit (CPU), a memory, and the like (not shown) are provided in the control section 11.

The storage section 13 is an internal memory, such as a read-only memory (ROM) or a random access memory (RAM), and has a program area and a data area (not shown). In the program area of the storage section 13, programs are stored which actualize the third embodiment based on operation procedures shown in FIG. 21 and FIG. 22 described hereafter. In the data area of the storage section 13, various flag information and various information required to operate the digital camera are stored, in addition to a recognition dictionary memory DM2 for storing basic character data used in character recognition and image memory FM2 for storing captured images. Note that the storage section 13 may be, for example, structured to include a detachable portable memory (recording media) such as a secure digital (SD) card or an integrated circuit (IC) card. Alternatively, the storage section 3 may be structured to be provided on a predetermined external server (not shown).

An operating section 14 performs character input, command input, etc., and includes an ON/OFF key for turning ON and OFF a camera function, a shutter key, and the like (not shown). The control section 11 performs various types of processing, such as camera ON/OFF processing and image-capture processing, as processing based on operation signals from the operating section 14. A display section 15 includes, for example, high-definition liquid crystal or organic electroluminescent (EL), and displays date and time information and stored images. Also, the display section 15 serves as a finder screen that displays a live-view image (monitor image) when the camera function is being used.

An imaging section 16, which is a component actualizing a digital camera function, is capable of capturing still images and video, and includes a camera lens section, an image sensor (such as a charge-coupled device [CCD] or a complementary metal-oxide-semiconductor [CMOS]), an image signal processing section, an analog processing section, a compression and expansion section, various sensor sections (such as a distance sensor and a light quantity sensor), etc. This imaging section 16 controls the adjustment of optical zoom, the driving of auto focus, the driving of a shutter, exposure, white balance, etc., and measures shutter speed (exposure time). Also, the imaging section 16 includes a bifocal lens capable of being switched between telescope and wide-angle according to a photographic subject, and a zoom lens, and performs telescopic/wide-angle or zoom imaging by operating a viewing angle changing mechanism that changes a focal distance.

An acceleration sensor 17 is a three-axis acceleration sensor included in the body (housing) of the digital camera, and is one of the components actualizing the character recognition function. Note that another configuration may be applied in which, for example, an acceleration sensor constituting a pedometer is used for character recognition function. During the operation of the character recognition function, the control section 11 performs character recognition based on measurement results from the acceleration sensor 17. That is, the control section 11 identifies a two-dimensional plane (vertical plane) parallel to the gravitational force direction based on measurement results from the acceleration sensor 17, or in other words, acceleration components in three axial directions (X, Y, and Z directions) that are orthogonal to one another, and then performs character recognition based on acceleration data that has been separated into components of two axes that are orthogonal in the plane, or in other words, acceleration data of a first axis (first component) and acceleration data of a second axis (second component).

Here, the control section 11 determines the start and the end of the writing of one character based on the acceleration data of the components of the two orthogonal axes separated in the two-dimensional plane that is parallel to the gravitational force direction. The control section 11 acquires measurement results from the acceleration sensor 17 during the period from the start to the end of the writing of one character as time-series acceleration vectors for one character, and selects a plurality of (such as two) acceleration vectors whose vector sizes are large values which are substantially orthogonal to each other (orthogonal or nearly orthogonal), from the acceleration vector sequence for one character. That is, when selecting a plurality of acceleration vectors as time-series acceleration vectors for one character that are measurement results of the acceleration sensor 17, the control section 11 selects acceleration vectors whose vector sizes are large values which are substantially orthogonal to each other, so as to reduce the effects of little noise from the acceleration sensor 17 itself, a slight hand movement, "shifting" of the position of the housing during the input of one character, etc.

Then, based on the plurality of acceleration vectors selected as described above, the control section 11 identifies a plane defined by the plurality of acceleration vectors. In this instance, the identified plane slightly differs according to selected acceleration vectors. Therefore, in the third embodiment, the control section 11 further selects plural sets of a plurality of vectors (such as two) whose vector sizes are large values which are substantially orthogonal to each other, after identifying a character plane for each set, identifies one plane from among each of the sets of planes as a character plane where a character has been written.

Then, the control section 11 detects the angle of the character plane identified as described above in relation to the direction of gravitational force, and converts the acceleration vector sequences of two components that are orthogonal in the character plane so as to achieve an angle at which the gravitational-force acceleration of the Z axis becomes "0", or so that the identified character plane matches a plane that is "Z-axis=0". Then, with the converted acceleration vector sequences of the two components as inputted character data, the control section 11 collates the inputted character data with all the basic character data in the recognition dictionary memory DM2, and thereby calculates similarity with the inputted character for each basic character to perform character recognition.

Figure 19:
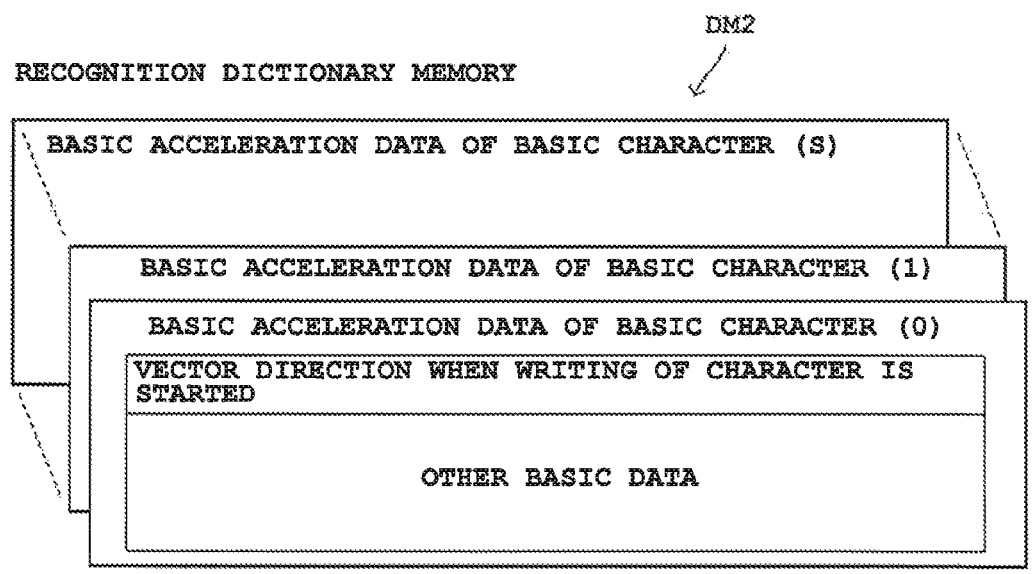
FIG. 19 is a diagram for explaining basic character data in a recognition dictionary memory DM2 of the third embodiment.

FIG. 19 is a diagram for explaining basic character data in the recognition dictionary memory DM2.

The recognition dictionary memory DM2 stores basic character data prepared in advance for use in character recognition, and is configured to store basic character data for S-number of characters. Basic character (0), basic character (1), to basic character (S) are respectively basic character data of the 0th character, basic character data of the 1st character, and basic character data of the S-th character, and are composed of two-dimensional acceleration data associated with the components of two orthogonal axes. The basic characters include data indicating a stroke direction in which the writing of a corresponding character is started (vector direction at the start of writing).

Next, the operational concept of the digital camera according to the third embodiment will be described with reference to flowcharts shown in FIG. 21 and FIG. 22. Here, each function described in the flowcharts is stored in a readable program code format, and operations based on these program codes are sequentially performed. Also, operations based on the above-described program codes transmitted over a transmission medium such as a network can also be sequentially performed. That is, the unique operations of the present embodiment can be performed using programs and data supplied from an outside source over a transmission medium, in addition to a recording medium.

Figure 20:
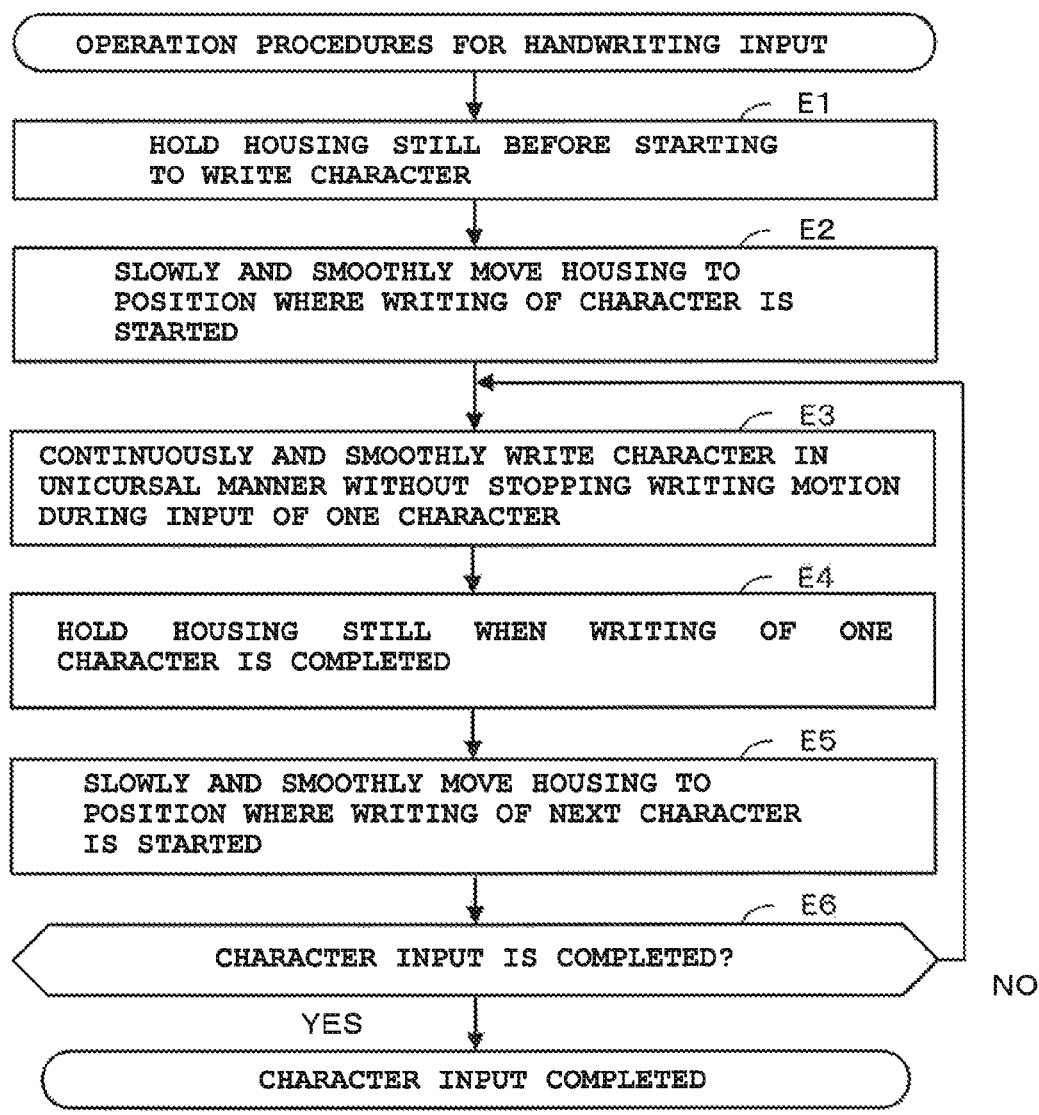
FIG. 20 is a flowchart for explaining operation procedures and an operation method of the third embodiment which are used when a user inputs a handwritten character.
Figure 21:
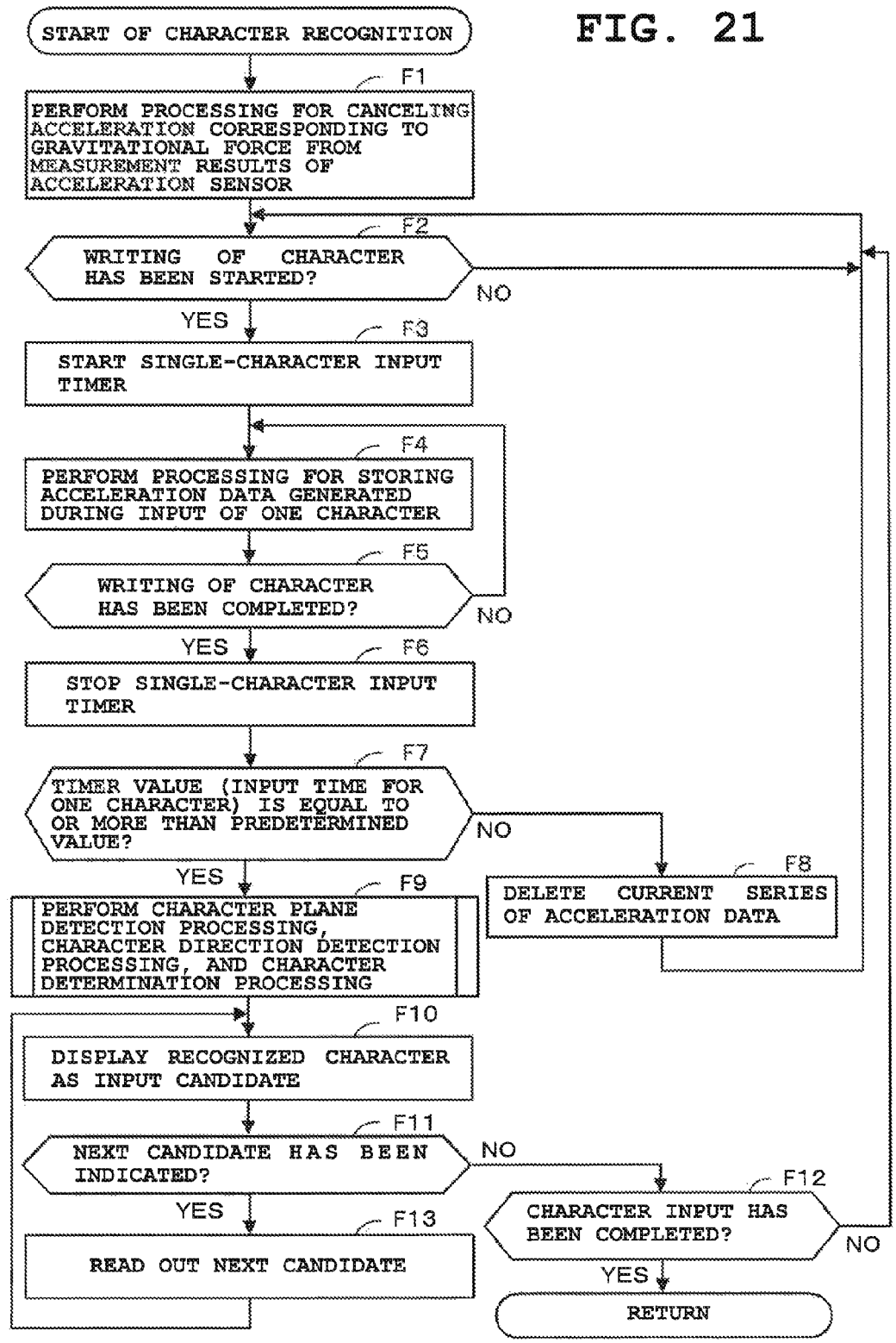
FIG. 21 is a flowchart outlining operations of the characteristic portion of a first embodiment from among all of the operations of the digital camera according to the third embodiment, which is performed when the character recognition function is turned ON and character recognition is started.
Figure 22:
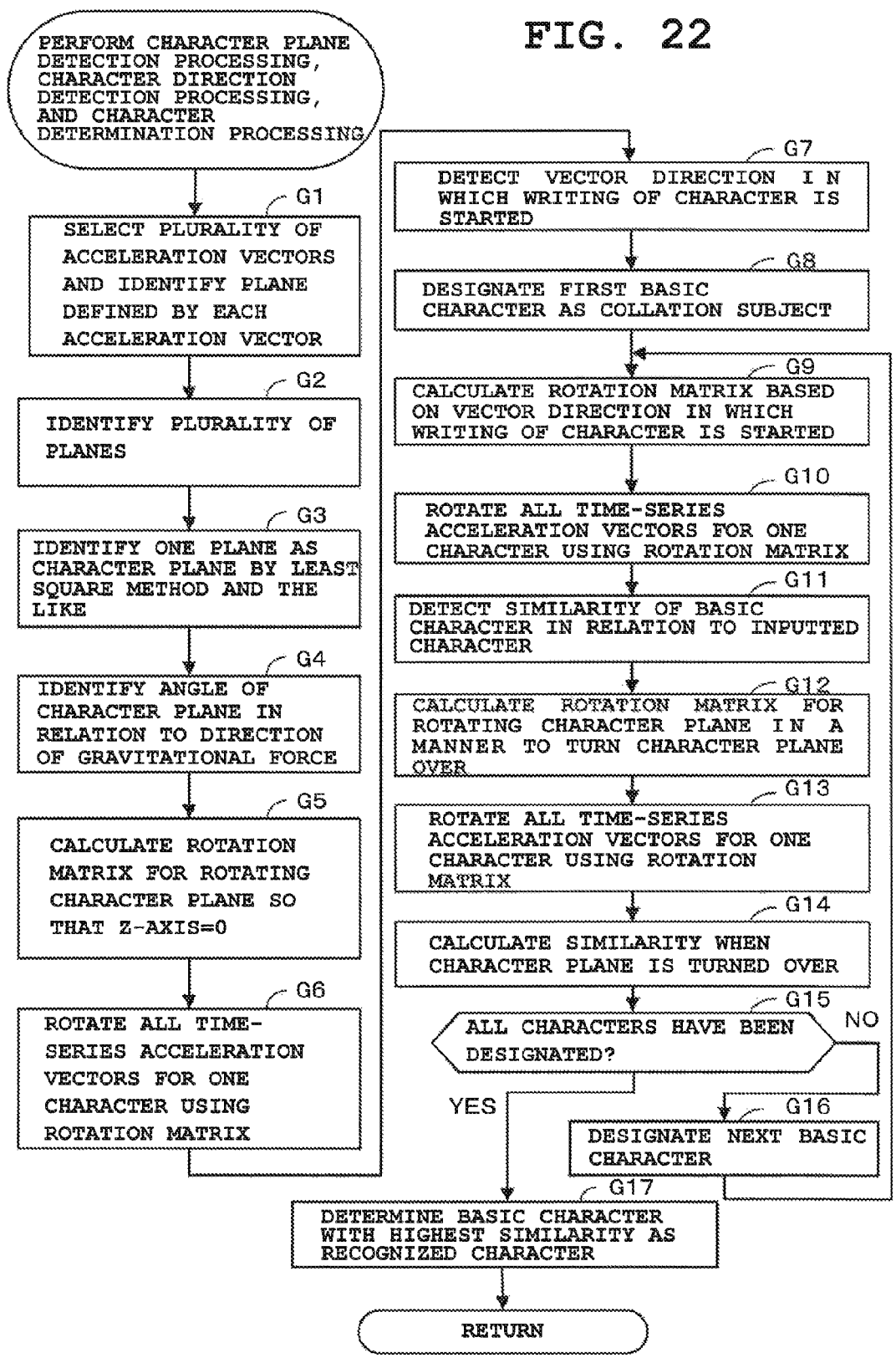
FIG. 22 is a flowchart for describing in detail character plane detection, character direction detection, and character determination processing (Step F9 in FIG. 21) in the third embodiment.

Here, before the flowcharts shown in FIG. 21 and FIG. 22 are described, operation procedures and an operation method used when a user performs a handwriting input of a character will be described with reference to FIG. 20.

First, after turning ON the character recognition function, the user holds the digital camera body (housing) in one hand and writes a character by moving the housing in a spatial plane. Specifically, before starting to write the character, the user holds the housing slightly still (Step E1 in FIG. 20), and then slowly and smoothly moves the housing to the writing start position of the character (Step E2).

Next, the user writes the character in a two-dimensional plane parallel to the direction of gravitational force. While inputting the character, the user moves the housing for each stroke without significantly changing the position of the housing. The housing is moved smoothly from the end point of one stroke to the starting point of the next stroke without being stopped, and so the character is written continuously and smoothly in a unicursal manner (Step E3). When writing of one character is completed, the user again holds the housing still (Step E4). Then, the user then slowly and smoothly moves the housing to the writing start position of the next character (Step E5), and starts to write the next character. Hereafter, until the character input is completed (NO at Step E6), the user repeatedly returns to above-described Step E3 to continue the handwriting operation, and thereby performs the handwriting input of a plurality of characters sequentially.

FIG. 21 is a flowchart outlining operations of the characteristic portion of a first embodiment from among all of the operations of the digital camera, which is performed when the character recognition function is turned ON and character recognition is started. Note that, after exiting the flow in FIG. 21, the procedure returns to the main flow (not shown) of the overall operation.

First, the control section 11 performs processing to cancel acceleration corresponding to gravitational force from measurement results from the acceleration sensor 17 (Step F1 in FIG. 21). That is, a measurement result (acceleration component) in the vertical direction, for example, includes upward 1 G as gravitational force acceleration. Therefore, gravitational force acceleration based on the position of the housing is measured before the writing of a character is started, and temporarily stored in the RAM of the storage section 13, in preparation for subtracting upward 1 G from a measurement result every time acceleration is measured.

Then, the control section 11 judges whether or not the writing of a character is started based on whether or not acceleration composite vectors of two components whose sizes are equal to or more than a predetermined threshold value have continued for a predetermined amount of time (predetermined number of times) or more (Step F2). Here, the user slowly and smoothly moves the housing to the writing start position of the character so that the two acceleration composite vectors whose sizes are equal to or more than the predetermined threshold value do not continue for a predetermined amount of time or more, or in other words, acceleration composite vectors of a predetermined threshold value or more do not continue for a predetermined amount of time (predetermined number of times) or more, and then starts the writing the character. As a result, the control section 11 detects that acceleration composite vectors of a predetermined threshold value or more have continued for a predetermined amount of time (predetermined number of times) or more (YES at Step F2).

When the start of the writing of the character is detected as described above, the control section 11 starts the measuring operation of a single-character input timer (not shown) for measuring an input time for one character (Step F3). Next, the control section 11 proceeds to processing for storing acceleration data that is generated during the input of one character (Step F4), and stores the acceleration of two components, from which acceleration corresponding to gravitational force has been canceled by the gravitational force acceleration being subtracted from measurement results from the acceleration sensor 17, in the RAM of the storage section 13 a measurement result at the time of the start of writing. Subsequently, the control section 11 judges whether or not the user has completed the writing of one character based on whether or not acceleration composite vectors of less than a predetermined threshold value have continued for a predetermined amount of time (predetermined number of times) or more (Step F5). In this instance, the user continuously moves the housing until the writing of one character is completed, while maintaining the position of the housing. That is, the user moves the housing such as to draw a smooth trajectory from the end point of one stroke to the starting point of the next stroke, so as to write the character in a unicursal manner without stopping. Then, when the writing of one character is completed, the user stops moving the housing. Accordingly, when the user finishes writing one character, the control section 11 detects that acceleration composite vectors of less than the predetermined threshold value have continued for the predetermined amount of time (number of times) or more (YES at Step F5).

Conversely, when the user is still inputting one character, the control section 11 detects that acceleration composite vectors of the predetermined threshold value or more have continued for the predetermined amount of time (number of times) or more (NO at Step F5). Therefore, the control section 11 returns to above-described Step F4 to repeat the processing for storing acceleration data that is generated during the input of one character in the RAM of the storage section 13, whereby the operation for storing measurement results from the acceleration sensor 17 is performed, for example, about 100 times per second. As a result, acceleration data of each component sequentially acquired during the period from the start to the end of the writing of one character are sequentially stored in the RAM of the storage section 13 as a series of acceleration data that is temporally continuous from the first stroke of the character to the last stroke including acceleration between strokes.

When the completion of the writing of the character is detected (YES at Step F5), the control section 11 stops the measuring operation of the single-character input timer described above (Step F6), and then judges whether or not the length of the measured time (input time for one character) is equal to or more than a predetermined threshold value (which is, for example, time required to input a simple character such as the number "1") (Step F7). When judged that the length of the measured time is less than the threshold value (NO at Step F7), the control section 11 deletes the current series of data stored in the RAM of the storage section 13 to cancel the current measurement results from the acceleration sensor 17 (Step F8), and returns to Step F2 to detect the start of the writing of a character. Conversely, when judged that the length of the input time for one character is equal to or more than the predetermined threshold value (YES at Step F7), the control section 11 performs character plane detection processing, character direction detection processing, and character determination processing described hereafter, based on the time-series acceleration data for one character stored in the RAM of the storage section 13 (Step F9).

FIG. 22 is a flowchart for describing in detail the character plane detection processing, the character direction detection processing, and the character determination processing (Step F9 in FIG. 21).

First, the control section 11 performs the character plane detection processing (Step G1 to Step G3). Specifically, the control section 11 selects a plurality of (such as two) acceleration vectors whose vector sizes are large values which are substantially orthogonal to each other, from among measurement results (time-series acceleration vectors for one character) from the acceleration sensor 17 which have been calculated during the input of one handwritten character, and identifies a plane defined by the plurality of acceleration vectors (Step G1). The control section 11 identifies a plurality of planes by repeating the plane identification processing described above, a plurality of number of times (Step G2).

That is, in order to identify a plurality of planes in various directions, the control section 11 selects plural sets of a plurality of (such as two) vectors whose acceleration vector sizes are large values which are substantially orthogonal to each other, and identifies a plane for each set. From the plurality of planes identified as described above, the control section 11 selects (identifies) one plane as a character plane using a least square method, weighted average (weighted average method), etc (Step G3).

After identifying the character plane as described above, the control section 11 detects the angle of the character plane in relation to the direction of gravitational force (Step G4). Next, the control section 11 calculates one "rotation matrix" that rotates the character plane so as to achieve an angle at which the gravitational-force acceleration of the Z-axis of the character plane becomes "0", or so that the identified character plane matches the "Z-axis=0" plane (Step G5). The control section 11 then rotates all time-series acceleration vectors for one character using the "rotation matrix" (Step G6). As a result, the time-series acceleration vectors for one character are all converted to data in a plane after rotation.

Next, the control section 11 proceeds to the character direction detection processing, and detects (identifies) the direction in which the writing of one character is started, or in other words, the stroke direction in which the writing of the character is started (vector direction at the start of writing) from the composite vectors of a component (x-component) corresponding to the X-axis and a component (y-component) corresponding to the Y-axis in the acceleration vectors for one character after rotation at above-described Step G6 (Step G7). Then, the control section 11 designates the first basic character as a collation subject from among the basic characters stored in the recognition dictionary memory DM2 (Step G8), and calculates "rotation matrix" for rotating the character direction identified at above-described Step G7 (the vector direction at the start of the writing of the character) in a manner to match the vector direction in which the writing of the designated basic character is started in the character plane (Step G9). Then, using the "rotation matrix", the control section 11 rotates all the time-series acceleration vectors for one character (Step G10). As a result, the time-series acceleration vectors for one character are converted to data matching the top and bottom directions of the basic character.

Then, with the acceleration vector sequence for one character converted by being rotated as described above as the inputted character data, the control section 11 calculates similarity between the inputted character data and a designated basic character data by collating them (Step G11). Subsequently, the control section 11 calculates a "rotation matrix" for rotating the acceleration vector sequence for one character converted by being rotated at above-described Step G10 in a manner to turn the character plane over with the vector direction at the start of the writing of the character as an axis (Step G12). Then, using the "rotation matrix", the control section 11 rotates all the time-series acceleration vectors for one character (Step G13). As a result, the time-series acceleration vectors for one character are converted to data having a frontback relationship with the character. Next, with the acceleration vector sequence for one character that has been converted by being rotated so as to be turned over as the inputted character data, the control section 11 calculates similarity between the inputted character data and a designated basic character data by collating them (Step G14).

After determining the two types of similarities for one character, the control section 11 judges whether or not all the basic characters in the recognition dictionary memory DM2 have been designated (Step G15). When judged that not all the basic characters have been designated (NO at Step G15), the control section 11 designates the next basic character (Step G16), and after returning to above-described Step G9, calculates similarities therefor as described above (Step G9 to Step G16). Hereafter, the control section 11 repeats the processing until all the characters are designated. When similarities are determined in association with all the basic characters (YES at Step G16), the control section 11 selects the character with the highest similarity as a recognized character (input candidate (Step G17).

When the character determination processing is completed as described above (Step F9 in FIG. 21), the control section 11 displays the recognized character determined by the character determination processing on the display section 15 as an input candidate (Step F10). Then, in this state, the control section 11 judges whether or not an operation for indicating a next candidate has been performed (Step F11), and whether or not the character recognition function has been turned OFF, or in other words, whether or not the completion of character input has been indicated by user operation (Step F12). When judged that an operation for indicating a next candidate has been performed (YES at Step F11), the control section 11 reads out the next candidate (Step F13) and displays the next candidate on the display section 15 as the input candidate (Step F10). When judged that the completion of character input has not been indicated (NO at Step F12), the control section 11 returns to above-described Step F2, and hereafter repeats character recognition for a next handwritten character by repeating the above-described operation. When judged that the completion of character input has been indicated (YES at Step F12), the flow in FIG. 21 is completed at this point.

As described above, in the third embodiment, when recognizing an operation for writing a character performed by the housing including the three-axis acceleration sensor 17 while being moved in a spatial plane, the control section 11 acquires the operation for writing a character as time-series acceleration vectors for one character. Next, the control section 11 selects a plurality of vectors whose vector sizes are large values which are substantially orthogonal to each other (orthogonal or nearly orthogonal) from among the acceleration vector sequence for one character, and identifies a plane defined by the plurality of acceleration vectors. The control section 11 then collates inputted character data acquired by converting the acceleration vector sequence for one character to acceleration vector sequences of two components orthogonal in the identified plane with basic character data for use in character recognition prepared in advance, and thereby performs character recognition. Accordingly, when performing a handwriting input of a character, the user is not required to keep the housing in the same position and is not required to use the same plane to write the character. That is, the character recognition device significantly reduces burden that is placed on the user when the user performs a handwriting input of a character, and smoothly and infallibly recognizes a character written in a spatial plane based on measurement results from the acceleration sensor 17. Thus, the usefulness of the character recognition device is high.

That is, unlike character recognition devices that integrate acceleration to determine a movement trajectory, the character recognition device of the present invention uses acceleration data, and uses the acceleration as it is for character recognition. Therefore, although the effect of gravitational force cannot be avoided, the character recognition device can effectively cope with slight changes or fluctuations in the gravitational force direction which are caused by changes in the position of the housing during character input. Accordingly, the character recognition device achieves robust character recognition, and does not require a sensor other than the acceleration sensor, such as a gyroscope. In addition, character recognition can be performed regardless of the position of the housing being held, and regardless of whether the plane is vertical, horizontal, or at an angle. Therefore, the character recognition device can significantly reduce burden placed on the user.

Also, the character recognition device selects, from an acceleration vector sequence for one character, plural sets of a plurality of vectors whose acceleration vector sizes are large values which are orthogonal to each other, and identifies a plane from among planes identified for each set as the character plane where the character has been written. As a result of this configuration, the character recognition device can appropriately identify a character plane.

In addition, the character recognition device converts the above-described acceleration vector sequence for one character to an acceleration vector sequence in which the identified character plane is rotated so as to match the "Z-axis=0" plane. As a result of this configuration, the character recognition device can perform character recognition regardless of the position of the housing being held, and regardless of whether the plane is vertical, horizontal, or at an angle.

Moreover, the character recognition device converts an acceleration vector sequence in a character plane by rotating it so that a direction in which writing is started for one character identified from the acceleration vector sequence matches a direction in which writing is started for a basic character included in the basic character data for use in character recognition, and collates, with the converted acceleration vector sequence as the inputted character data, the inputted character data with the basic character data. As a result of this configuration, the character recognition device can perform character recognition regardless of the directions of the top and bottom of a character in a character plane.

Furthermore, the character recognition device rotates acceleration vector sequences of two components in a plane so as to turn the plane over, with a direction in which writing is started for the character as an axis. As a result of this configuration, the character recognition device can perform character recognition even when the fronts and the backs of characters are opposite between an inputted character and a basic character.

Still further, the character recognition device does not use a character recognition method that requires the separation of elements (strokes) constituting a character, and recognizes the start and the end of the writing of one character based on acceleration vector sequence for one character. As a result of this configuration, the character recognition device can determine the input of a character without requiring complicated and difficult operations and movements such as pen-up and pen-down in a situation where a character is written in the air.

Yet still further, the character recognition device determines the start and the end of the writing of one character based on whether or not the size of a composite vector in the acceleration of each orthogonal component acquired by a measurement result from the acceleration sensor 17 being separated in a plane is equal to or more than a predetermined threshold value, and whether or not a composite vector whose size is equal to or more than the predetermined threshold value has continued for a predetermined amount of time or more. Therefore, when using the character recognition device, the user is only required to hold the housing still before starting to write a character, and slowly and smoothly move the housing to the writing start position of the character. Then, when the writing of the character is completed, the user again holds the housing still. That is, the character recognition device can determine the start and the end of the writing of one character by a very natural operation performed by the user.

In each of the above-described embodiments, a configuration has been applied in which an acceleration vector sequence for one character is converted to an acceleration vector sequence where an identified character plane is rotated so as to match the "Z-axis=0" plane. However, the plane is not limited to "Z-axis=0", and a configuration may be applied in which an acceleration vector sequence for one character is converted to an acceleration vector sequence where a character plane is rotated so as to match an "X-axis=0" or "Y-axis=0" plane.

Additionally, in the above-described embodiments, a character is written in a spatial plane. However, the present invention is not limited thereto, and a character may be written with the housing being in contact with a wall surface or the like.

Moreover, in the above-described embodiments, the present invention has been applied as a character recognition device to a digital camera having a character recognition function. However, the present invention may be applied to a mobile phone, a desktop electronic calculator, a wristwatch, a personal computer (laptop computer), a personal digital assistant (PDA), a music player, and the like having a character recognition function.

Furthermore, the "devices" or the "units" described in the above-described embodiments are not required to be in a single casing, and may be separated into a plurality of casings by function. In addition, the steps in the above-described flowcharts are not required to be processed in time series, and may be processed in parallel, or individually and independently.

While the present invention has been described with reference to the preferred embodiments, it is intended that the invention be not limited by any of the details of the description therein but includes all the embodiments which fall within the scope of the appended claims.

What is claimed is:

1. A character recognition device which recognizes an operation for writing a character performed while a housing with a three-axis acceleration sensor is moved in a plane based on a measurement result from the acceleration sensor, the character recognition device comprising:
   an acquisition unit which acquires the measurement result from the acceleration sensor corresponding to the operation for writing the character performed while the housing is moved as a time-series acceleration vector sequence for one character;
   a selection unit which selects a plurality of acceleration vectors whose vector sizes are large values and are substantially orthogonal to each other from among the acceleration vector sequence for one character acquired by the acquisition unit;
   a plane identification unit which identifies a plane using the plurality of acceleration vectors selected by the selection unit;
   a first conversion unit which converts the acceleration vector sequence for one character acquired by the acquisition unit into acceleration vector sequences of two components that are orthogonal in a plane based on the plane identified by the plane identification unit; and
   a character recognition unit which performs character recognition by using input character data based on the acceleration vector sequences of two components converted by the first conversion unit, and collating the input character data with basic character data prepared in advance for use in character recognition.

2. The character recognition device according to claim 1, wherein the selection unit selects plural sets of a plurality of vectors whose acceleration vector sizes are large values and are substantially orthogonal to each other; and
wherein the plane identification unit identifies a respective plane for each set selected by the selection unit, and identifies one plane as a character plane where a character has been written using the planes identified for each set.

3. The character recognition device according to claim 1, wherein the first conversion unit converts the acceleration vector sequence for one character into the acceleration vector sequences of two components such that the acceleration vector sequences of two components are orthogonal in a plane that is rotated with respect to the plane identified by the plane identification unit such that gravitational force acceleration of one component from among three components corresponding to each axis of the three-axis acceleration sensor is zero.

4. The character recognition device according to claim 1, further comprising:
a direction identification unit which identifies a direction of starting writing for one character from among the acceleration vector sequences of two components; and
a second conversion unit which rotates the acceleration vector sequences of two components so that the direction of starting writing identified by the direction identification unit matches a direction of starting writing of a basic character stored in the basic character data for use in the character recognition;
wherein the character recognition uses the acceleration vector sequences of two components converted by the second conversion unit as input character data, and collates the input data with the basic character data.

5. The character recognition device according to claim 4, further comprising a third conversion unit which rotates the acceleration vector sequences of two components rotated by the second conversion unit such that the plane in which the acceleration vector sequences of two components are provided is turned over with the direction of starting writing as an axis.

6. The character recognition device according to claim 1, further comprising:
a determination unit which determines a start of writing and an end of writing for one character based on the acceleration vector sequence acquired by the acquisition unit;
wherein the selection unit selects a plurality of vectors whose vector sizes are large values and are substantially orthogonal to each other from among acceleration vectors sequentially acquired in the time-series acceleration vector sequence by the acquisition unit during a period from when the start of writing is determined to when the end of writing is determined for one character by the determination unit.

7. The character recognition device according to claim 6, wherein the determination unit determines the start of writing and the end of writing for one character based on whether or not a size of a composite vector in acceleration of each component orthogonally separated in a plane acquired by the measurement result from the acceleration sensor is equal to or more than a predetermined threshold value and has continued for more than a predetermined amount of time.

8. A non-transitory computer readable storage medium having a program stored thereon, the program being executable by a computer to perform functions comprising:
an acquisition function for, when recognizing an operation for writing a character performed while a housing with a three-axis acceleration sensor is moved in a plane based on a measurement result from the acceleration sensor, acquiring the measurement result from the acceleration sensor corresponding to the operation for writing the character performed while the housing is moved as a time-series acceleration vector sequence for one character;
a selection function for selecting a plurality of acceleration vectors whose vector sizes are large values and are substantially orthogonal to each other from among the acquired acceleration vector sequence for one character;
a plane identification function for identifying a plane using the selected plurality of acceleration vectors;
a conversion function for converting the acquired acceleration vector sequence for one character to acceleration vector sequences of two components that are orthogonal in a plane based on the identified plane; and
a character recognition function for performing character recognition by using input character data based on the acceleration vector sequences of two components, and collating the input character data with basic character data prepared in advance for use in character recognition.

* * * * *

UNITED STATES PATENT AND TRADEMARK OFFICE
CERTIFICATE OF CORRECTION

| | |
|---|---|
| PATENT NO. | : 8,571,321 B2 |
| APPLICATION NO. | : 13/189744 |
| DATED | : October 29, 2013 |
| INVENTOR(S) | : Morio Yamanouchi |

It is certified that error appears in the above-identified patent and that said Letters Patent is hereby corrected as shown below:

On the title page item (*) insert --This patent is subject to a terminal disclaimer--.

Signed and Sealed this
Fifteenth Day of April, 2014

Michelle K. Lee
*Deputy Director of the United States Patent and Trademark Office*